(12) United States Patent
Furukawa et al.

(10) Patent No.: US 6,243,346 B1
(45) Date of Patent: *Jun. 5, 2001

(54) DISK DEVICE HAVING A DRIVE UNIT FOR PROVIDING A SMALL-HEIGHT STRUCTURE

(75) Inventors: Ken'ichi Furukawa, Atsugi; Atsushi Kirii, Tendo; Kouji Teranishi, Atsugi; Satoru Manabe, Atsugi; Ken'ichi Hori, Atsugi; Kazutomo Imi, Atsugi, all of (JP)

(73) Assignee: Mitsumi Electric Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,119

(22) Filed: Feb. 1, 1999

Related U.S. Application Data

(62) Division of application No. 08/638,546, filed on Apr. 26, 1996, now Pat. No. 5,917,795.

(30) Foreign Application Priority Data

| Apr. 28, 1995 | (JP) | 7-106415 |
| Apr. 28, 1995 | (JP) | 7-106416 |
| Apr. 28, 1995 | (JP) | 7-106417 |
| Apr. 28, 1995 | (JP) | 7-106418 |
| May 2, 1995 | (JP) | 7-108598 |
| May 2, 1995 | (JP) | 7-108599 |
| May 2, 1995 | (JP) | 7-108600 |
| May 22, 1995 | (JP) | 7-122778 |

(51) Int. Cl.[7] ................................................. G11B 33/02
(52) U.S. Cl. ...................... 369/75.1; 369/77.2; 360/99.01
(58) Field of Search ........................... 360/97.01, 97.02, 360/99.01, 99.02, 99.06; 369/75.1–77.2; 361/679, 685, 748, 749

(56) References Cited

U.S. PATENT DOCUMENTS

| 4,930,029 | * | 5/1990 | Morita | 360/97.01 |
| 5,062,016 | * | 10/1991 | Zupancic | 360/97.01 |
| 5,198,933 | * | 3/1993 | Matsushita et al. | 360/99.06 |
| 5,255,137 | * | 10/1993 | Suzuki | 360/97.02 |
| 5,255,254 | * | 10/1993 | Watanabe et al. | 369/75.1 |
| 5,255,256 | * | 10/1993 | Engler et al. | 369/77.2 |
| 5,264,975 | * | 11/1993 | Bajorek et al. | 360/97.01 |
| 5,361,181 | * | 11/1994 | Kurata | 360/99.02 |
| 5,386,407 | * | 1/1995 | Park | 369/77.2 |
| 5,396,384 | * | 3/1995 | Caldeira et al. | 360/98.01 |
| 5,532,996 | * | 7/1996 | Okabe et al. | 369/77.2 |
| 5,570,269 | * | 10/1996 | Korikawa et al. | 361/685 |
| 5,600,503 | * | 2/1997 | Sakogawa | 360/69 |
| 5,768,049 | * | 6/1998 | Morehouse et al. | 360/97.01 |

* cited by examiner

Primary Examiner—Brian E. Miller
(74) Attorney, Agent, or Firm—Anderson, Kill & Olick P.C.

(57) ABSTRACT

A disk device includes a drive mechanism having at least a disk motor and an optical head, the disk motor rotating a recording disk, and the optical head accessing the disk to reproduce information from the disk and/or record information in the disk. A first printed circuit board controls the disk motor and the optical head of the drive mechanism, the first printed circuit board receiving signals from the optical head and/or sending signals to the optical head to perform the reproducing of information and/or the recording of information. The disk device further comprises a second printed circuit board electrically coupling the drive mechanism to the first printed circuit board, the second printed circuit board including a connector coupled to wire patterns of the signals received and/or sent by the first printed circuit board, and the connector being coupled to the first printed circuit board.

3 Claims, 25 Drawing Sheets

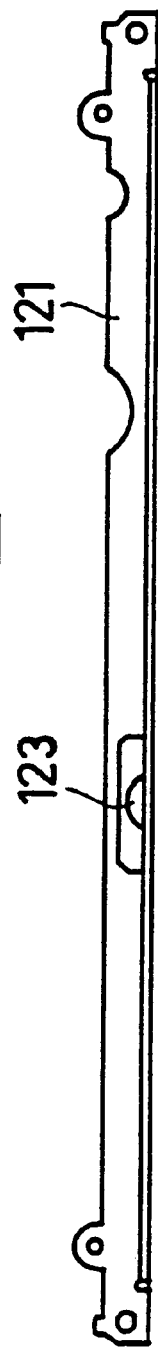
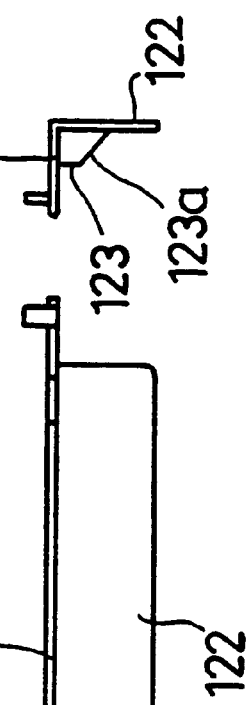
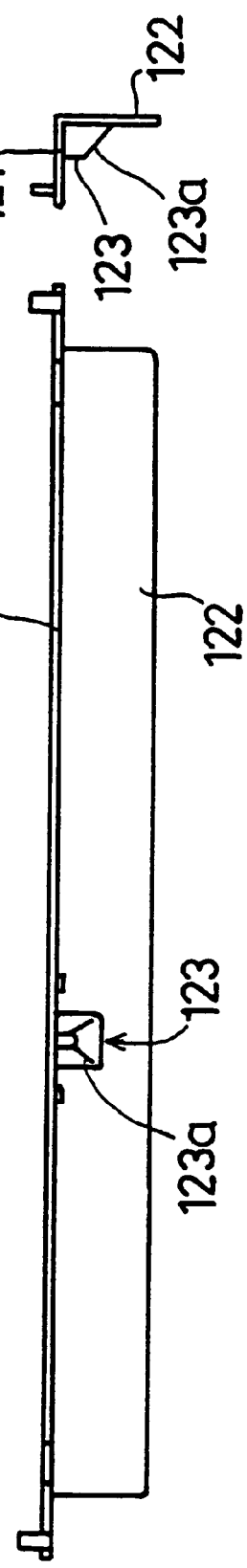

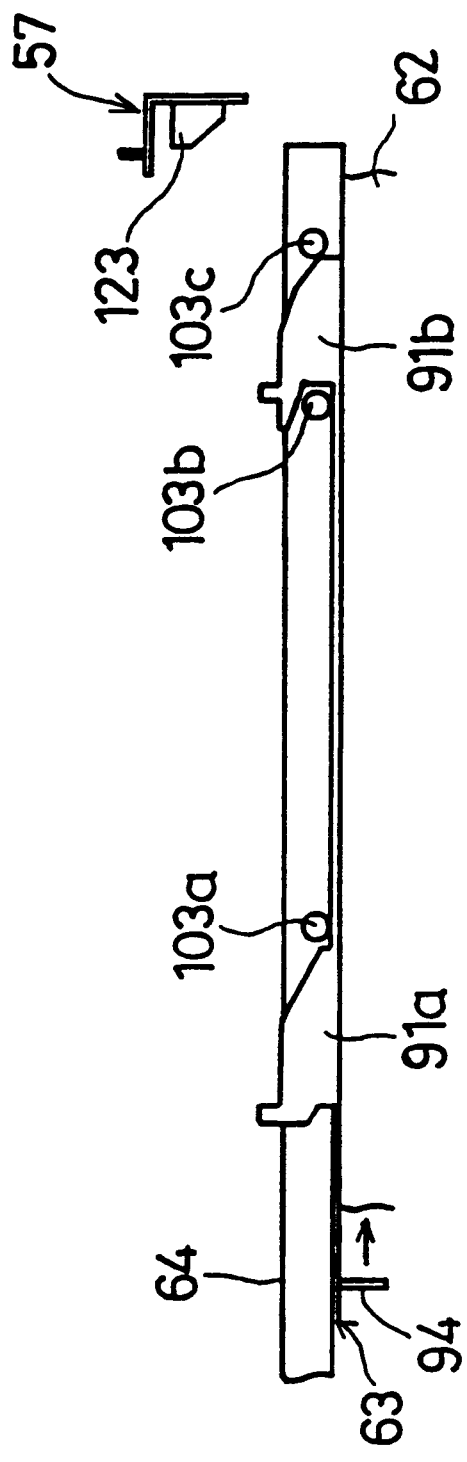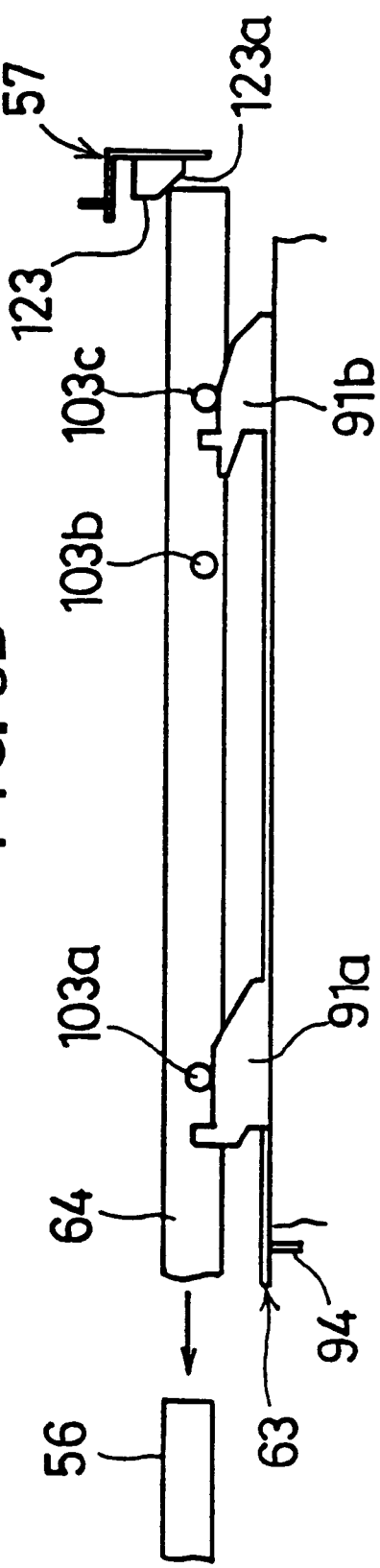
FIG. 8A
FIG. 8B

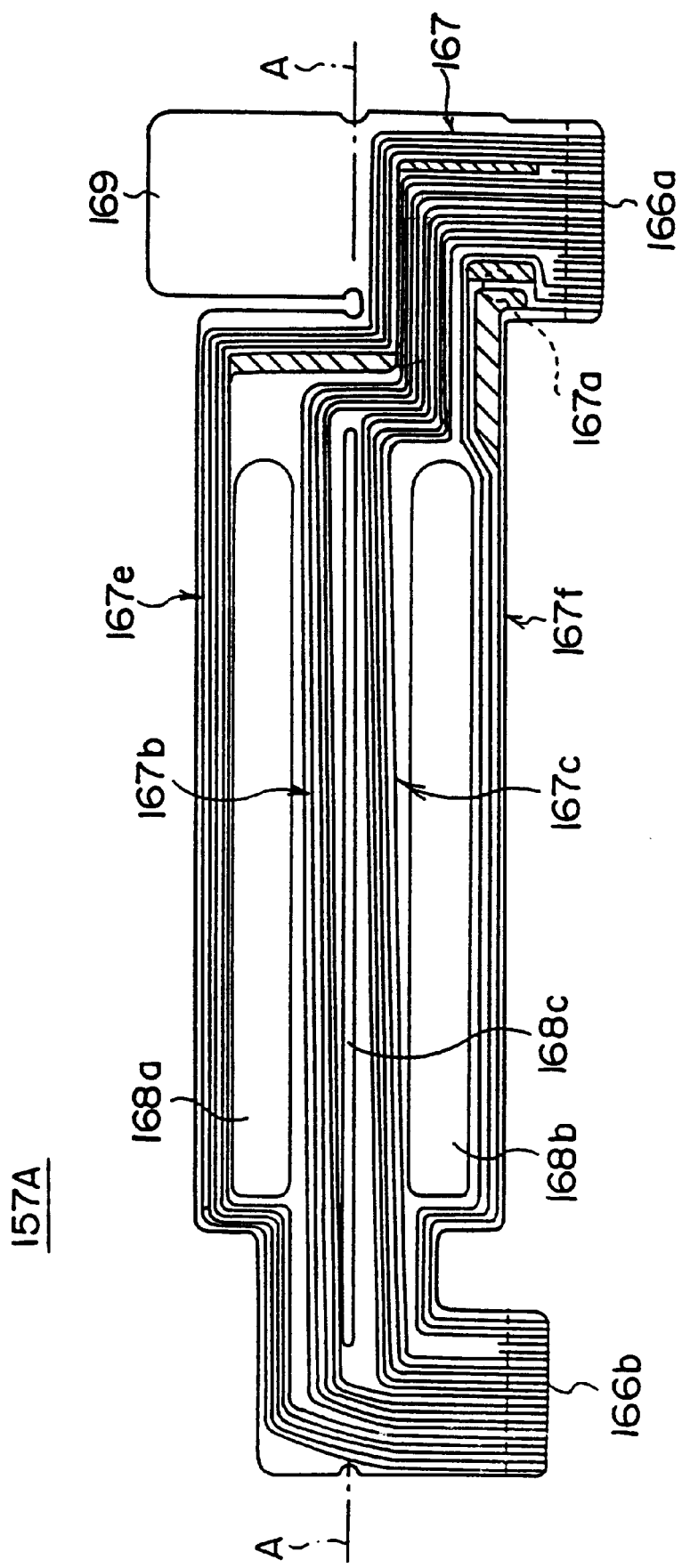

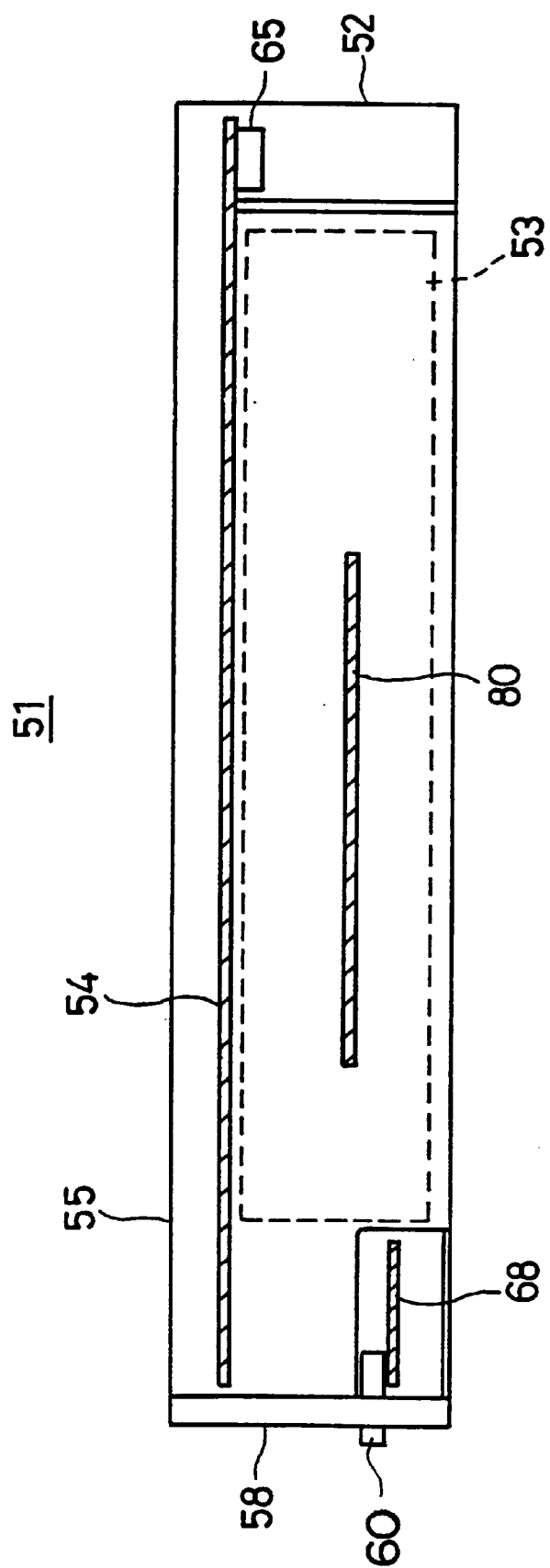

FIG. 22A
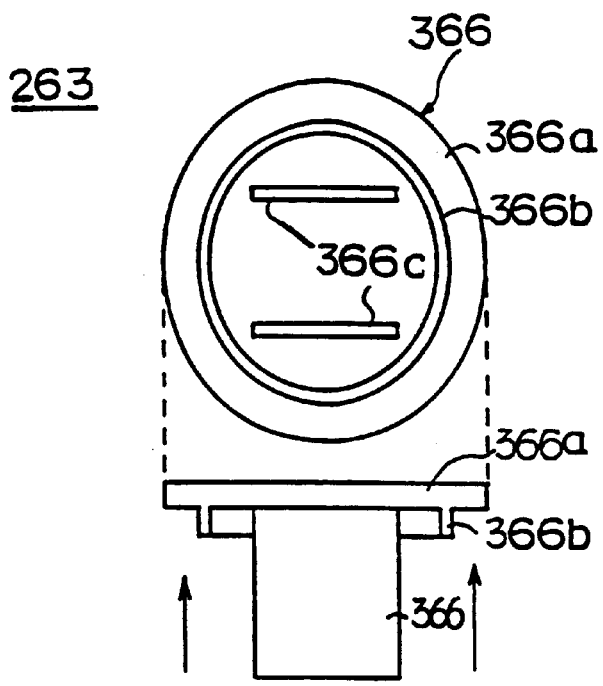
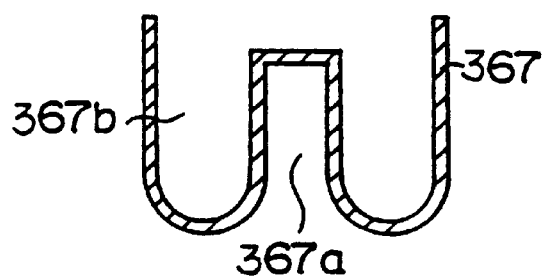
FIG. 22B
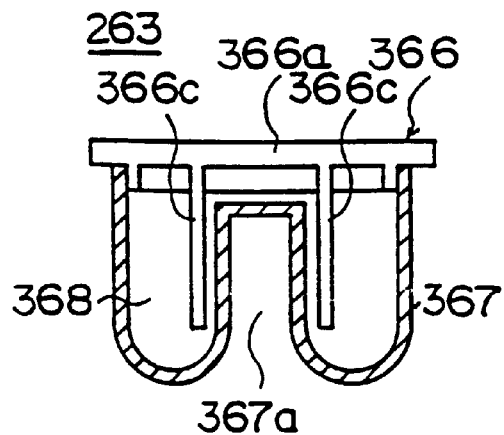
FIG. 22C
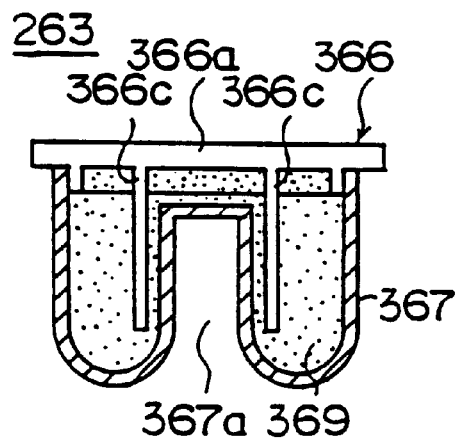

DISK DEVICE HAVING A DRIVE UNIT FOR PROVIDING A SMALL-HEIGHT STRUCTURE

This Application is a Division of Ser. No. 08/638,546 filed on Apr. 26, 1996, now U.S. Pat. No. 5,917,795.

BACKGROUND OF THE INVENTION (1) Field of the Invention

The present invention generally relates to a disk device, and more particularly to a disk device having a drive unit which reproduces information from a recording disk and/or records information in the disk, wherein a disk holder is movable between an insert/eject position and a disk-loaded position so that the disk on the disk holder is loaded or unloaded.

(2) Description of the Related Art

Various types of recording media including floppy disks (FD), compact disks (CD), laser disks (LD), magneto-optical disks (MO), mini disks (MD), optical disks and others are commercially available in recent years. A disk device uses a recording disk which is one of these recording media, in order to reproduce information and/or record information. A compact disk-read-only memory (CD-ROM) and a recordable compact disk (CD-R) are types of optical disks. In a case of a CD-R disk device, a CD-R disk held on the disk device is accessed to reproduce information from the CD-R disk and/or record information in the CD-R disk by using an optical head.

It is desirable to design a CD-R disk device having a small-size, small-height structure, in order to install the CD-R disk device in a host computer. In order to provide a small-height structure for the CD-R disk device, it is necessary to widen an internal space of the disk device for installing other parts of the disk device. In addition to the need for a small-size, small-height structure of the disk device, there is a need for a reduction of the manufacturing cost for the CD-R disk device.

Further, in the case of the CD-R disk device, it is desirable to take vibration-preventive measures to prevent vibrations of a drive unit of the disk device when any impact is given to the disk device. In order to take the vibration-preventive measures for the CD-R disk device, it is necessary to widen an internal space of the disk device and install vibration preventive parts in the internal space of the disk device.

Further, in the case of the CD-R disk device, it is desirable to provide a disk device having a small-height structure in which an improved flexible printed circuit cable having a number of required signal lines is included. It is required that the printed circuit board of the CD-R disk device include many signal lines in order to reproduce information from the disk and/or record information in the disk. The signal lines of the improved flexible printed circuit cable must be connected to the signal lines of the printed circuit board.

FIG. 1 shows a conventional CD-R disk device 11. As shown in FIG. 1, the disk device 11 generally has a casing 12, a printed circuit board 13, a drive unit 14, and a cover plate 15. The printed circuit board 13 includes a control circuit therein and is arranged at a lowermost portion of the casing 12. The drive unit 14 is arranged over the printed circuit board 13. The cover plate 15 is arranged on the top of the casing 12 to protect internal parts of the drive unit 14.

A front bezel 21 is arranged at a front surface of the casing 12. The front bezel 21 includes an insertion opening 22, and an eject button 23 is arranged on the front bezel 21. The front bezel 21 includes an ejection hole 24, and the ejection hole 24 is used to manually eject the disk from the disk device 11 when an emergency occasion occurs.

The drive unit 14 includes a drive mechanism 25, a slider 26 and a disk holder 27. A disk cartridge 29 containing a disk (CD-R) 28 is inserted into the disk holder 27. The disk cartridge 29 has a shutter 29a. When the disk cartridge 29 is inserted, the shutter 29a of the cartridge 29 is slid so that the disk 28 is partially exposed.

The drive mechanism 25 includes a chassis 31 and an optical head 32 mounted on the chassis 31. The drive mechanism 25 includes a head moving unit which moves the optical head 32 in a radial direction of the disk 28. The movement of the optical head 32 by the head moving unit is supported on a pair of guide rods 33a and 33b. Further, the drive mechanism 25 includes a disk ejecting unit which automatically ejects the disk cartridge 29 from the disk device 11 by rotating an ejection motor 26a to move the slider 26. The disk ejecting unit includes the ejection motor 26a, a worm gear (not shown) and a gear 26b. The rotating force of the ejection motor 26a is transmitted to the slider 26 through the gear 26b and the worm gear.

Electrical parts of the drive unit 14 are electrically connected to the printed circuit board 13 by a flexible printed circuit cable 34.

The slider 26 moves up and down the disk holder 27. The slider 26 includes a pair of cam plates 35 provided on right and left sides of the slider 26 adjacent to the disk holder 27. Each cam plate 35 has guide portions 35a and 35b with sloping regions. The disk holder 27 has laterally extending pins 36a and 36b provided on right and left sides of the disk holder 27. The pins 36a and 36b of the disk holder 27 are engaged with the guide portions 35a and 35b of the cam plates 35 and slidable on the sloping regions of the guide portions 35a and 35b.

The disk holder 27 has a rotating lever 37. When the disk cartridge 29 is inserted into the disk holder 27, the shutter 29a of the disk cartridge 29 is slid by the rotating lever 37 so that the disk 28 is partially exposed.

In the above-described drive unit 14, when the disk cartridge 29 is not yet inserted into the disk holder 27, the disk holder 27 is arranged at an insert/eject position above the slider 26.

When the disk cartridge 29 is inserted into the disk holder 27, the slider 26 is slid in an eject direction opposite to the insert direction of the disk cartridge 29 so that the disk holder 27 is moved down from the insert/eject position to a disk-loaded position by the movement of the slider 26. When the disk holder 27 is at the disk-loaded position, the disk 28 in the disk cartridge 29 is rotated by the disk motor and is accessed by the optical head to reproduce information from the disk 28 or record information in the disk 28.

When the disk cartridge 29 is automatically ejected from the disk device 11, the eject button 23 on the front bezel 21 is depressed by the operator. The ejection motor 26a is rotated by the depression of the eject button 23 to move the slider 26 in the insert direction. The disk holder 27 is moved up from the disk-loaded position to the insert/eject position by the movement of the slider 26.

The disk device 11 includes an emergency ejection mechanism provided on the slider 26. When an emergency occasion such as a malfunction of the ejection motor 26a or a power down of a host computer occurs. By using the emergency ejection mechanism, the disk cartridge 29 can be manually ejected from the disk device 11. The emergency ejection mechanism is constituted by a crank mechanism including a crank arm and a rotary lever. The slider 26 is moved in the insert direction by the crank mechanism so that the disk holder 27 is moved up from the disk-loaded position to the insert/eject position.

In the above emergency ejection mechanism, a longitudinally extending eject lever 38 is arranged on one side of the slider 26. When the emergency occasion occurs, a shaft or the like is inserted from the ejection hole 24 of the front bezel 21 to push the eject lever 38 in the insert direction. The slider 26 is slid in the insert direction by the movement of the eject lever 38 due to the pushing force of the shaft, so that the disk holder 27 is moved up from the disk-loaded position to the insert/eject position by the movement of the slider 26.

The disk holder 27 includes a guide member 27a, and the guide member 27a serves to guide a upward or downward movement of the disk holder 27.

FIG. 2A shows a bottom of the slider 26 of the conventional disk device 11. As shown in FIG. 2A, the emergency ejection mechanism is arranged on the slider 26. The longitudinally extending eject lever 38 is arranged on one side of the slider 26. The eject lever 38 has a pin 39a and a pin 39b which vertically extend toward the bottom of the slider 26. The slider 26 has a slot 40a and a slot 40b. The pins 39a and 39b of the eject lever 38 are connected to the slots 40a and 40b of the slider 26, and the eject lever 38 is slidable on the slider 26 in the insert/eject directions. The eject lever 38 has a pin 41 at a rear end of the eject lever 38, and the pin 41 vertically extends toward the bottom of the slider 26.

A crank arm 42 has a shaft 42a at a central portion of the crank arm 42. The crank arm 42 is rotatably supported on the slider 26 by the shaft 42a. The crank arm 42 has a slot 42b at one end of the crank arm 42 and a pin 42c at the other end. The pin 41 of the eject lever 38 is connected to the slot 42b of the crank arm 42.

A rotary lever 43 has a shaft 43a at a central portion of the rotary lever 43. The rotary lever 43 is rotatably supported on the slider 26 by the shaft 43a. The rotary lever 43 has a slot 43b at one end of the rotary lever 43, and the pin 42c of the crank arm 42 is connected to the slot 43b. The slider 26 has a pair of locking portion 44a and 44b at rear central positions of the slider 26, and the other end of the rotary lever 43 is arranged between the locking portions 44a and 44b.

The crank mechanism of the above emergency ejection mechanism is comprised of the crank arm 42 and the rotary lever 43. The slider 26 is a sheet metal member, and the eject lever 38 is arranged on one side of the slider 26. It is necessary that the emergency ejection mechanism pushes the central portion of the slider 26 in the insert direction. Therefore, the emergency ejection mechanism of the conventional disk device 11 must include the crank arm 42 and the rotary lever 43.

Upon the emergency occasion, a shaft (not shown) is inserted from the ejection hole 24 of the front bezel 21 by the operator, and the shaft is brought into contact with the front end of the eject lever 38. The eject lever 38 is manually pushed in the insert direction by the inserted shaft. The crank arm 42 at this time is rotated around the pin 42a in the direction indicated by the arrow. The rotary lever 43 is rotated around the pin 43a by the crank arm 42. Thus, the slider 26 is slid in the insert direction by the rotary lever 43, so that the disk holder 27 is moved up from the disk-loaded position to the insert/eject position. When the disk holder 27 is at the insert/eject position, the disk cartridge 29 on the disk holder 27 can be taken out from the disk device 11 by the operator.

When the emergency ejection mechanism is operated, the ejection motor 26a is disengaged from the gear 26b by a mechanical or electrical unit (not shown).

Since the above-described emergency ejection mechanism including the eject lever 38, the crank arm 42 and the rotary lever 43 is used by the conventional disk device 11, it is difficult to provide a reduction of the manufacturing cost for the disk device. Further, for the conventional disk device 11 including the above emergency ejection mechanism, it is difficult to widen an internal space of the disk device for installing other parts of the disk device.

In the conventional disk device 11, the emergency lever 38 requires a large amount of the stroke to adequately slide the slider 26. The emergency lever 38 tends to vibrate in large amounts of amplitude when an impact is given to the disk device, and the emergency ejection mechanism of the conventional disk device 11 is not suitable for the prevention of the vibrations of the drive unit.

FIG. 2B shows a bottom of the drive unit 14 of the conventional disk device 11.

As shown in FIG. 2B, the drive unit 14 includes head moving units 32a and 32b, which move the optical head 32 in a radial direction of the disk 28. The head moving units 32a and 32b are arranged near the guide rods 33a and 33b. A first portion 34a of the flexible printed circuit cable 34 extends from the bottom of the drive unit 14. The first portion 34a electrically connects the head moving units 33a and 33b to the printed circuit board 13. Electrical power from the printed circuit board 13 is supplied to the head moving units 32a and 32b via the first portion 34a.

The optical head 32 of the drive unit 14 is electrically connected to the printed circuit board 13 by a second portion 34b of the flexible printed circuit cable 34. Data signals from the optical head 32, used to reproduce information from the disk 28, are sent to the printed circuit board 13 via the second portion 34b. Also, data signals from the printed circuit board 13, used to record information in the disk 28, are sent to the optical head 32 via the second portion 34b. For this purpose, it is necessary that the second portion 34b of the flexible printed circuit cable 34 include more than 20 signal lines (or wire patterns) which interconnect the printed circuit board 13 and the optical head 32.

In the conventional disk device 11, as shown in FIG. 2B, insulators 19a and 19b of a resilient material such as rubber are arranged at rear corner portions of the bottom surface of the chassis 31 of the drive mechanism 25. The insulators 19a and 19b serve to absorb the vibrations of the drive unit 14 when the disk device is impacted.

Since the flexible printed circuit cable 34 including the first portion 34a and the second portion 34b is used by the conventional disk device 11, it is difficult to provide a disk device having a small-height structure in which a flexible printed circuit cable having a number of required signal lines is suitably arranged.

In order to suitably arrange a flexible printed circuit cable having the number of required signal lines within the disk device, it is necessary to use the above flexible printed circuit cable 34. Alternatively, two or more flexible printed circuit cables may be used instead. However, in both cases, it is difficult to widen the internal space of the disk device in which other parts of the disk device are included.

If the number of required signal lines are included in a single flexible printed circuit cable, there is a problem in that the interval between the wire patterns of the flexible printed circuit cable is limited and becomes small, and the electrostatic capacity of the flexible printed circuit cable becomes too great. In the case of the conventional disk device 11, it is difficult to eliminate the above-mentioned problems. Also, the noise resistance of the flexible printed circuit cable deteriorates if the electrostatic capacity of the flexible printed circuit cable is great.

Therefore, it is desired to provide a disk device having a small-height structure in which an improved printed circuit cable having the number of required signal lines is included.

FIG. 2C and FIG. 2D show vibration absorbing parts arranged in the casing 12 of the conventional disk device 11.

In the conventional disk device 11, as shown in FIG. 1, the drive unit 14 is arranged on the printed circuit board 13 within the casing 12. In order to provide a small-height structure for the disk device 11, it is necessary to reduce an internal space between the bottom of the drive unit 14 and the top of the printed circuit board 13. The insulators 19a and 19b of a resilient material, such as rubber, are placed in contact between the chassis 31 of the drive mechanism 25 and the printed circuit board 13. The vibration preventive effect of the conventional disk device 11 against vibrations of the drive unit 14 when an impact is given to the disk device 11 is not adequate.

Further, in the conventional disk device 11, as shown in FIGS. 2C and 2D, a number of dampers 40a and a number of dampers 40b are arranged within the casing 12, for the vibration absorbing purpose. As shown in FIG. 2C, two dampers 40a are placed between the right side walls of the casing 12 and the drive unit 14, and two dampers 40a are placed between the left side walls of the casing 12 and the drive unit 14. As shown in FIG. 2D, two dampers 40b are placed between the bottom of the drive unit 14 and the base of the casing 12.

When mounting the drive unit 14 on the casing 12, the dampers 40a and 40b are interposed between the drive unit 14 and the casing 12.

The insulators 19a and 19b on the bottom of the chassis 31 serve to absorb vertical vibrations of the drive unit 14 when a light impact is given to the disk device 11. The dampers 40b within the casing 12 serve to absorb vertical vibrations of the drive unit 14 when a relatively heavy impact is given to the disk device 11. The dampers 40a within the casing 12 serve to absorb horizontal vibrations of the drive unit 13 when an impact is given in the disk inserting and ejecting directions to the disk device 11.

In the conventional disk device 11, the dampers 40a and 40b are used and an internal space of the disk device 11 to install the dampers 40a and 40b therein is required. Therefore, it is difficult to provide a small-size or small-height structure for the disk device.

Further, in the conventional disk device 11, it is difficult to ensure an adequate level of vibration preventive characteristic of the disk device unless the insulators 19a and 19b provide a required vibration absorbing performance.

Moreover, in the conventional disk device 11, when the disk device 11 is installed in a horizontal attitude, the vibration absorbing function is attained by the insulators and dampers. However, when the disk device 11 is installed in a vertical attitude (it stands on one side wall of the casing 12), the insertion opening of the disk holder 27 may deviate from the insertion opening 22 of the front bezel 21 due to the gravity. It is difficult for the user insert the disk into the disk device 11 or eject the disk from the disk device.

Therefore, it is desired to provide a disk device having a small-height structure in which improved vibration absorbing parts are included.

SUMMARY OF THE INVENTION

An object of the present invention is to provide an improved disk device in which the above-described problems are eliminated.

Another object of the present invention is to provide a disk device which includes a drive unit having a small-height structure in which an internal space of the disk device to install other parts of the disk device therein is widened.

Still another object of the present invention is to provide a disk device which includes a drive unit having a small-height structure in which an improved flexible printed circuit cable having a number of signal lines required to reproduce and/or record information related to a recording disk is included.

A further object of the present invention is to provide a disk device which includes a drive unit having a small-height structure in which a number of improved vibration absorbing parts which efficiently prevent the vibrations of the disk device are included.

The above-mentioned objects of the present invention are achieved by a disk device which includes: a drive mechanism including at least a disk motor and an optical head, the disk motor rotating the disk, and the optical head accessing the disk to reproduce information from the disk and/or record information in the disk; and a first printed circuit board controlling the disk motor and the optical head of the drive mechanism, the first printed circuit board receiving signals from the optical head and sending signals to the optical head to perform the reproducing of information and/or the recording of information, wherein the disk device further comprises a second printed circuit board electrically coupling the drive mechanism to the first printed circuit board, the second printed circuit board including a connector coupled to wire patterns of the signals received and sent by the first printed circuit board, and the connector being electrically coupled to the first printed circuit board.

The above-mentioned objects of the present invention are achieved by a disk device which includes: a drive mechanism including at least a disk motor and an optical head, the disk motor rotating the disk, and the optical head accessing the disk to reproduce information from the disk and/or record information in the disk; and a first printed circuit board controlling the disk motor and the optical head of the drive mechanism, the first printed circuit board receiving signals from the optical head and sending signals to the optical head to perform the reproducing of information and/or the recording of information, wherein the disk device further comprises: a second printed circuit board electrically coupling the drive mechanism to the first printed circuit board, the second printed circuit board including a connector coupled to wire patterns of the signals received and sent by the first printed circuit board, and the connector being electrically coupled to the first printed circuit board; and a third printed circuit board in which at least an eject button and additional electrical parts are included, the eject button and the additional electrical parts being electrically coupled to the first printed circuit board.

The above-mentioned objects of the present invention are achieved by a disk device which includes: a disk holder holding the disk, the disk holder including a set of laterally extending guide pins including first guide pins and second guide pins; a cam plate movably supporting the disk holder such that the disk holder is movable between an insert/eject position and a disk-loaded position; a drive mechanism including at least a disk motor and an optical head, the disk motor rotating the disk, and the optical head accessing the disk to reproduce information from the disk and/or record information in the disk; and a first printed circuit board controlling the disk motor and the optical head of the drive mechanism by receiving signals from the optical head and sending signals to the optical head to perform the reproducing of information and/or the recording of information, wherein the cam plate comprises: first cam portions on which bottom portions of the first guide pins are slid when the disk holder is moved between the insert/eject position and the disk-loaded position; and second cam portions which overlap top portions of the second guide pins and support the top portions when the disk holder is at the disk-loaded position.

The above-mentioned objects of the present invention are achieved by a disk device which includes: a casing in which all parts of the disk device are included, the casing including a number of first bosses; and a drive mechanism including at least a disk motor and an optical head, the disk motor rotating the disk, and the optical head accessing the disk to reproduce information from the disk and/or record information in the disk, the drive mechanism being arranged in the casing and having corners at positions corresponding to the first bosses of the casing, wherein the disk device further comprises: a plurality of vibration absorbing parts arranged at the corners of the drive mechanism and fixed to the first bosses of the casing to absorb vibrations of the drive mechanism, the drive mechanism including a chassis having mounting holes at the corners of the drive mechanism, and each vibration absorbing part being fitted to a periphery of one of the mounting holes of the chassis.

According to the present invention, it is possible to provide a small-height structure for the disk device that is installed in a host computer. Since the disk device of the present invention includes an improved emergency ejection mechanism having a simple structure, it is possible to provide a reduction of the manufacturing cost for the disk device.

Since the disk device of the present invention includes the improved flexible printed circuit cable having the required signal lines, it is possible to provide a small-height structure for the disk device. Further, since the disk device of the present invention includes the improved vibration absorbing parts which efficiently prevent the vibrations of the disk device, it is possible to provide a small-height structure for the disk device in which the improved vibration absorbing parts are included.

BRIEF DESCRIPTION OF THE DRAWINGS

Other objects, features and advantages of the present invention will be more apparent from the following detailed description when read in conjunction with the accompanying drawings in which:

FIGS. 6A, 6B and 6C are views of a stopper unit of the disk device of the present embodiment;

FIGS. 8A and 8B are diagrams for a manual ejecting operation of the present embodiment to eject the disk cartridge from the disk device;

FIG. 13 is a view of another flexible printed circuit cable which is used by the optical head in FIG. 11;

FIG. 15 is a diagram showing an arrangement of a main printed circuit board, a relaying printed circuit board and the additional printed circuit board of the disk device in FIG. 3;

FIGS. 22A, 22B and 22C are views of the further embodiments of the vibration absorbing parts of the disk device in FIG. 21.

DETAILED DESCRIPTION OF THE PREFERRED EMBODIMENTS

A description will now be given of the preferred embodiments of the present invention with reference to the accompanying drawings.

Figure 3:
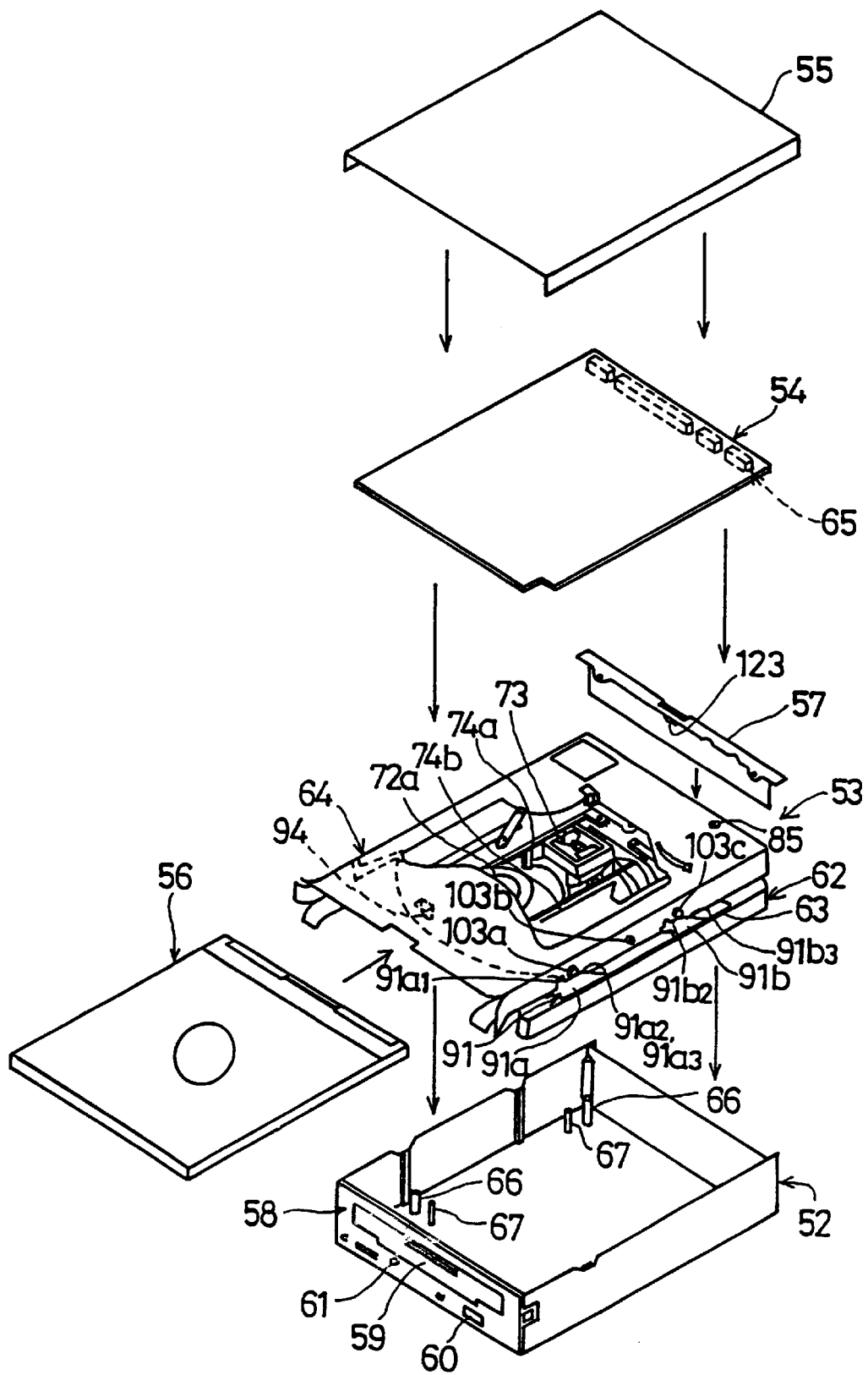
FIG. 3 is an exploded perspective view of a disk device to which one embodiment of the present invention is applied.

FIG. 3 shows a disk device 51 to which one embodiment of the present invention is applied. In the disk device 51, a removable recording disk which is a recording medium is accessed to reproduce information from the disk and/or record information in the disk.

As shown in FIG. 3, the disk device 51 generally has a casing 52, a drive unit 53, a printed circuit board 54 and a cover plate 55. The printed circuit board 54 includes a control circuit which controls the drive unit 53. The recording medium which is the CD-R is contained in a disk cartridge 56. The disk cartridge 56 is inserted into the drive unit 53 so that the CD-R is loaded within the disk device 51. The disk device 51 further includes a stopper unit 57 which will be described later.

The casing 52 is formed into a box-like configuration, for example, by die casting of aluminum. The inside of the casing 52 is configured by the forming process such that the drive unit 53, the printed circuit board 54 and the stopper unit 57 are suitably arranged in the casing 53. A front bezel 58 is attached to a front portion of the casing 52. The front bezel 58 includes an insertion opening 59 through which the disk cartridge 56 is inserted into the disk device 51. An eject button 60 is arranged on the front bezel 58. Further, the front bezel 58 includes an ejection hole 61 which is located below the insertion opening 59.

The eject button 60 is provided to automatically eject the disk cartridge 56 from the disk device 51 by using an ejection motor (which will be described later) when the eject button 60 is depressed by the operator. The ejection hole 61 is used to insert a shaft (not shown) therein, in order to manually eject the disk cartridge 56 from the disk device 51 upon an emergency occasion such as a malfunction of the ejection motor or a power down of the host computer.

In the front bezel 58, an indicator, a volume control and a phone terminal are additionally arranged as required by specifications of the disk device 51. A printed circuit board (which will be described later) including the eject button 60 and other electrical parts is arranged at a rear portion of the front bezel 58.

The drive unit 53 generally has a drive mechanism 62, a cam plate 63, and a disk holder 64. The drive mechanism 62 includes at least a disk motor and an optical head, the disk motor rotating the disk (the CD-R) contained in the disk cartridge 56, and the optical head accessing the disk to reproduce information from the disk and/or record information in the disk. The cam plate 63 has a vertically extending projection 94 at a front end portion of the cam plate 63 in the vicinity of a longitudinal center line of the cam plate 63. In the present embodiment, the drive unit 53 is arranged at a lowermost portion of the casing 51. These parts of the drive unit 53 will be described below, with reference to FIG. 4.

The stopper unit 57 is arranged at a rear portion of the drive unit 53 within the casing 52. The stopper unit 57 serves to prevent the drive unit 23 from being excessively moved toward the rear end of the chassis 52 when the disk cartridge 56 is inserted into the disk holder 64. The stopper unit 57 serves to guide a movement of the disk holder 64 when the disk holder 64 is moved from the disk-loaded position to the insert/eject position. The stopper unit 57 is arranged at a height which is substantially the same as a height of the insert/eject position of the disk holder 64 on the disk device 51.

The printed circuit board 54 includes a control circuit controlling the disk motor and the optical head of the drive mechanism 62 and processing signals from the optical head to perform the reproducing and/or the recording of information. The printed circuit board 54, the drive unit, and the above-mentioned printed circuit board of the front bezel 58 are electrically coupled to each other by corresponding connectors and cables. The printed circuit board 54 has a set of connectors 65 at a rear end portion of the printed circuit board 54. The printed circuit board 54 and the host computer are electrically connected via the connectors 65. In the present embodiment, the printed circuit board 54 is arranged in the casing 52 above the drive unit 53.

The cover plate 55 is arranged on the top of the casing 52 to protect the above-described parts within the casing 52 from dusts.

Figure 4:
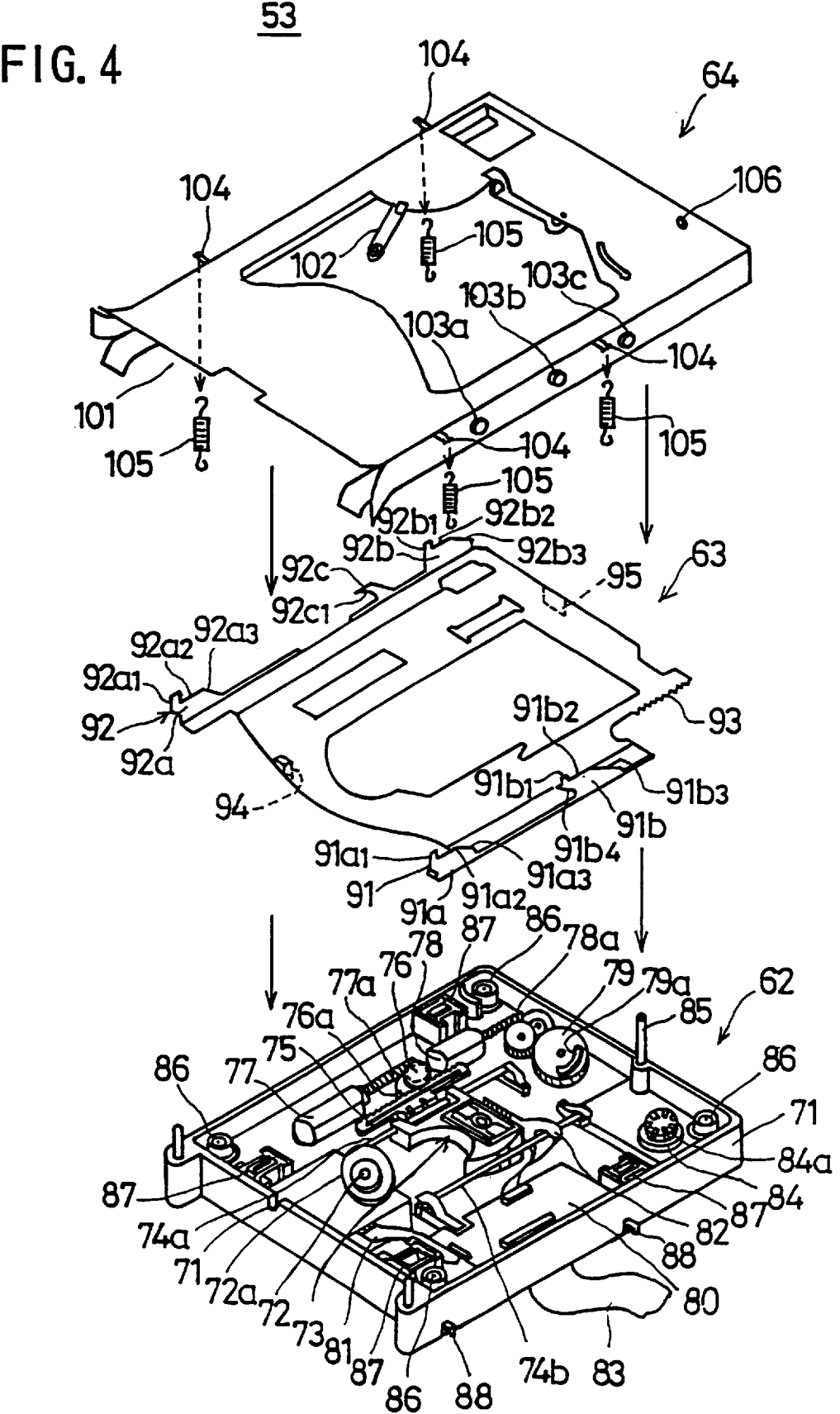
FIG. 4 is an exploded perspective view of a drive unit of the disk device of the present embodiment.

FIG. 4 shows the drive unit 53 of the disk device 51 of the present embodiment.

Referring to FIG. 4, the drive mechanism 62 includes a chassis 71 of a resin material, and a disk motor (not shown) and an optical head 73 which are arranged in the chassis 71. The disk (the CD-R) in the disk cartridge 56 is rotated by the disk motor. The disk is accessed by the optical head 73 to reproduce information from the disk and/or record information in the disk. The disk motor is connected to a spindle 72, and a chuck part 72a is attached to the spindle 72 as shown in FIG. 4. The disk cartridge 56 is held by the chuck part 72a when the disk holder 64 is at the disk-loaded position.

The optical head 73 is movably supported by a pair of guide rods 74a and 74b, and the optical head 73 is supported by the guide rods 74a and 74b such that the optical head 73 is movable in a radial direction of the disk. A rack 75 is fixed to the optical head 73, and the rack 75 is engaged with a gear 76. The gear 76 includes a worm wheel 76a. A worm gear 77a is fixed to a rotating shaft of a head moving motor 77. The worm wheel 76a of the gear 76 is engaged with the worm gear 77a of the head moving motor 77. The optical head 73 is moved in the radial direction of the disk by the head moving motor 77 via the worm gear 77a, the work wheel 76a, the gear 76 and the rack 75 when the head moving motor 77 is rotated.

The ejection motor 78 is arranged within the chassis 71. A worm gear 78a is fixed to the rotating shaft of the ejection motor 78. The worm gear 78a is engaged with a main gear 79 via a set of gears. A cam 79a is attached to the top of the main gear 79. The cam 79a is engaged with a connecting piece 95 of the cam plate 63. When the ejection motor 78 is rotated, the cam plate 63 is slid in the insert direction by the engagement of the cam 95a and the connecting piece 95, which will be described below.

A relaying printed circuit board 80 is arranged in the drive mechanism 62 at a side portion of the chassis 71. The disk motor of the drive mechanism 62 is electrically connected to the relaying printed circuit board 80 by a flexible printed circuit cable 81. The optical head 73 is electrically connected to the relaying printed circuit board 80 by a flexible printed circuit cable 82. Also, the printed circuit board 54 is electrically connected to the relaying printed circuit board 80 by a flexible printed circuit cable 83.

A damper 84 is arranged at a rear corner portion of the chassis 71. A gear 84a is attached to the damper 84. The gear 84a is engaged with a rack of the cam plate 63. The engagement between the gear 84a of the damper 84 and the rack of the cam plate 63 serves to reduce the speed of the sliding movement of the cam plate 63.

A vertically extending guide shaft 85 is arranged at a rear end wall of the chassis 71 near the damper 84. The guide shaft 85 is loosely fitted to a guide hole 106 of the disk holder 64. The upward and downward movements of the disk holder 64 relative to the cam plate 63 are guided by the guide shaft 85.

Four insulators 86 of a resilient material, such as rubber, are arranged at four corner portions of the chassis 71. Each of the insulators 86 has an internal opening. As shown in FIG. 3, the casing 52 has four bosses 66 provided at four corner portions of the casing 52. The drive unit 53 is arranged within the casing 52 such that the insulators 86 of the chassis 71 are fitted into the bosses 66. Since the chassis 71 is attached to the casing 52 via the insulators 86, the insulators 86 serve to absorb vertical vibrations of the drive unit 53 when any impact is given to the disk device 51.

Four horizontal insulators 87 of a resilient material, such as rubber, are arranged within the chassis 71 in the vicinity of the insulators 86, respectively. Each of the insulators 87 has an internal slot. As shown in FIG. 3, the casing 52 has four bosses 67 provided on the casing 52 in the vicinity of the bosses 66. The drive unit 53 is arranged within the casing 52 such that the horizontal insulators 87 are fitted into the bosses 67. Since the chassis 71 is attached to the casing 52 via the horizontal insulators 87, the insulators 87 serve to absorb horizontal vibrations of the drive unit 53 when any impact is given to the disk device 51.

The chassis 71 has a set of lock pieces 88 provided on both sides of the chassis 71. A front end wall of the chassis 71 has a cut-out portion 71a at a position corresponding to the projection 94 of the cam plate 63. The position of the cut-out portion 71a of the chassis 71 corresponds to the position of the ejection hole 61 of the front bezel 58.

The cam plate 63 is arranged over the drive mechanism 62. The cam plate 63 is a sheet metal member. The cam plate 63 has a vertically extending side wall 91 at one side, in which a cam portion 91a and a cam portion 91b are formed. The cam plate 63 has a vertically extending side wall 92 at the other side, in which a cam portion 92a, a cam portion 92b and a cam portion 92c are formed.

As shown in FIG. 4, in the side wall 91 of the cam plate 63, the cam portion 91a includes a stopper 91a1, a horizontal region 91a2 and a sloping region 91a3. The cam portion 91b includes a stopper 91b1, a horizontal region 91b2, a sloping region 91b3 and a recessed sloping region 91b4. The recessed sloping region 91b4 is located below the stopper 91b1.

In the opposite side wall 92 of the cam plate 63, the cam portion 92a includes a stopper 92a1, a horizontal region 92a2 and a sloping region 92a3. Similarly to the cam portion 92a, the cam portion 92b includes a stopper 92b1, a horizontal region 92b2 and a sloping region 92b3. The cam portion 92c is located between the cam portion 92a and the cam portion 92b. The cam portion 92c includes a recessed sloping region 92c1.

A first cam portion is constituted by the horizontal regions 91a2 and 91b2 of the cam portions 91a and 91b and the horizontal regions 92a2 and 92b2 of the cam portions 92a and 92b. A second cam portion is constituted by the recessed sloping region 91b4 of the cam portion 91b and the recessed sloping region 92c1 of the cam portion 92c.

Since the above-mentioned cam portions of the cam plate 63 are included in the present embodiment, it is possible to provide a small-height structure for the disk device. The disk device 51 of the present embodiment does not require the upper guide portions as in the slider 26 of the conventional disk device 11.

A rack 93 is arranged at a rear corner portion of the cam plate 63 in the vicinity of the side wall 91. The rack 93 is engaged with the gear 84a of the damper 84. As described above, the engagement between the rack 93 and the gear 84a serves to reduce the speed of the sliding movement of the cam plate 63.

The vertically extending projection 94 is arranged at the front end portion of the cam plate 63 in the vicinity of the longitudinal center line of the cam plate 63. The position of the projection 94 corresponds to the position of the ejection hole 61 on the front bezel 58.

The connecting piece 95 is arranged at the rear end portion of the cam plate 63 in the vicinity of the longitudinal center line of the cam plate 63. The connecting piece 95 is connected with the cam portion 79a of the main gear 79 of the drive mechanism 62. As described above, when automatically ejecting the disk holder 64 from the disk device 51, the connecting piece 95 is connected with the cam portion 79a, and the cam plate 63 is slid in the insert direction by the rotating force of the ejection motor 78 to move up the disk holder 64 from the disk-loaded position to the insert/eject position.

The disk holder 64 is arranged over the cam plate 63. The disk holder 64 is a sheet metal member. The disk holder 64 includes a holding portion 101 in which the disk cartridge 56 is held. The disk holder 64 includes a lever 102. The lever 102 is connected with the shutter 113 of the disk cartridge 56 when the disk cartridge 56 is inserted into the disk holder 64, so that the shutter 113 is opened and the disk in the disk holder 56 is partially exposed.

The disk holder 64 has laterally extending guide pins 103a, 103b and 103c on both sides of the disk holder 64. The guide pins 103a, 103b and 103c of the disk holder 64 are connected with the cam portions 91a, 91b, 92a, 92c and 92b of the cam plate 63, which will be described later.

As shown in FIG. 4, the disk holder 64 has four lock pieces 104 on both sides of the disk holder 64 at positions corresponding to the lock pieces 88 of the chassis 71. The four coil springs 105 are attached to the lock pieces 104 of the disk holder 64 and to the lock pieces 88 of the chassis 71. When the drive mechanism 62, the cam plate 63 and the disk holder 64 are assembled together, the disk holder 64 is pulled toward the chassis 71 of the drive mechanism 62 by the biasing forces of the coil springs 105.

The disk holder 64 has the guide hole 106 at the rear end portion of the disk holder 64. As described above, the guide shaft 85 of the chassis 71 is loosely fitted to the guide hole 106. The upward and downward movements of the disk holder 64 relative to the cam plate 63 are guided by the guide shaft 85.

Figure 5A:
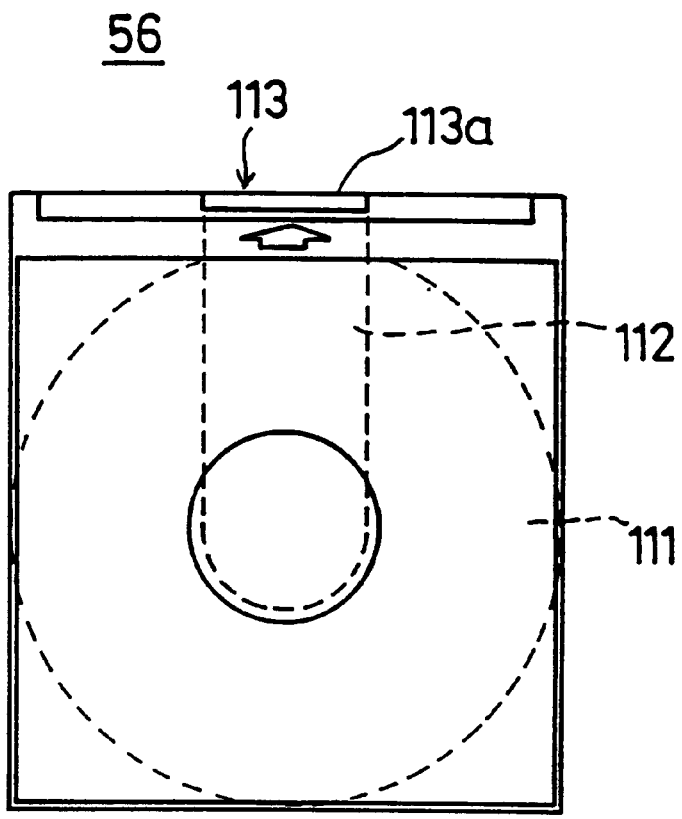
FIGS. 5A and 5B are views of a disk cartridge for use with the disk device of the present embodiment.
Figure 5B:
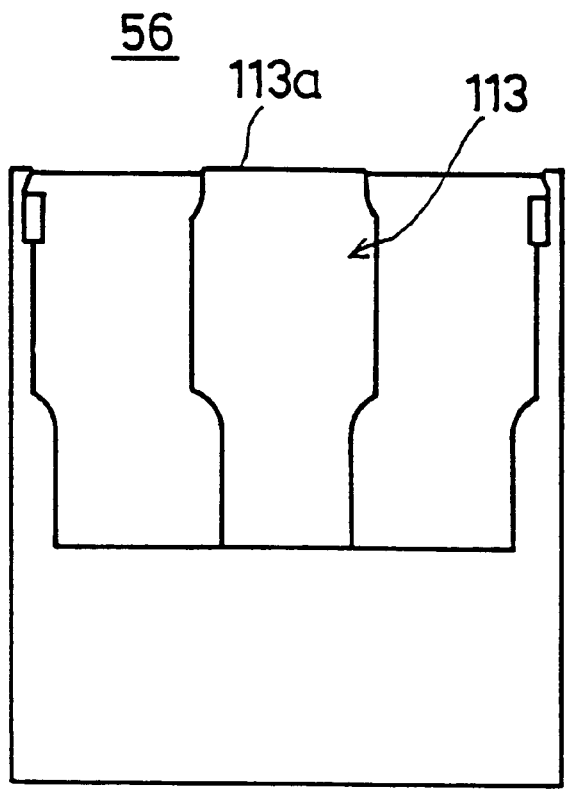

FIGS. 5A and 5B show the disk cartridge 56 used by the disk device 51 of the present embodiment. FIG. 5A is a front view of the disk cartridge 56, and FIG. 5B is a rear view of the disk cartridge 56.

Referring to FIGS. 5A and 5B, the disk cartridge 56 contains a recordable compact disk (CD-R) 111 therein. The disk cartridge 56 includes an opening 112 through which the CD-R 111 is partially exposed. A shutter 113 is provided at an upper portion of the disk cartridge 56. The opening 112 of the disk cartridge 56 can be opened or closed when the shutter 113 is slid or returned.

The shutter 113 of the disk cartridge 56 is slidable in a direction perpendicular to the insert and eject directions in which the disk cartridge 56 is inserted into and ejected from the disk device 51. When the disk cartridge 56 is inserted into the disk holder 64, an end 113a of the shutter 113 is slid by the lever 102, so that the opening 112 is opened and the CD-R 111 is partially exposed as shown in FIG. 5A.

The CD-R 111 is a type of optical disk, and the user can record information in the disk 111 once only. After user setting data, such as video data or code data, is recorded in the CD-R 111 by the user, the CD-R 111 is used to reproduce original information and the user setting data from the CD-R 111. The CD-R 111 is utilized for a video file system, a document file system or a massive data library system.

FIGS. 6A, 6B and 6C show the stopper unit 57 of the disk device 51 of the present embodiment. FIG. 6A is a bottom view of the stopper unit 57, FIG. 6B is a front view of the stopper unit 57, and FIG. 6C is a side view of the stopper unit 57.

Referring to FIGS. 6A through 6C, the stopper unit 57 is a sheet metal member having an L-shaped cross-section. As shown in FIG. 3, the stopper unit 57 transversely extends in a width direction of the drive unit 53, and the longitudinal axis of the stopper unit 57 is perpendicular to the insert and eject directions of the disk cartridge 56.

The stopper unit 57 generally has a horizontal wall 121 and a vertical wall 122. The horizontal wall 121 has a set of hole portions which are used to mount the stopper unit 57 on the casing 52. The vertical wall 122 has a projection 123 at a preset position of the stopper unit 57. The projection 123 vertically extends along the vertical wall 122. The projection 123 has a tapered portion 123a which is engaged with the rear end of the disk holder 64 when the disk holder 64 is moved between the insert/eject position and the disk-loaded position by the cam plate 63. The tapered portion 123a of the projection 123 is configured to guide the upward or downward movement of the disk holder 64.

As described above, the stopper unit 57 is arranged at the rear portion of the drive unit 53 in the casing 52. The stopper unit 57 serves to guide the upward or downward movement of the disk holder 64. In addition, the stopper unit 57 serves to prevent the drive unit 53 from being excessively moved toward the rear end of the casing 52 when the disk cartridge 56 is inserted into the disk holder 64. Further, the stopper unit 57 is arranged at a height which is the same as a height of the insert/eject position of the disk holder 64 on the disk device 51.

Figure 7A:
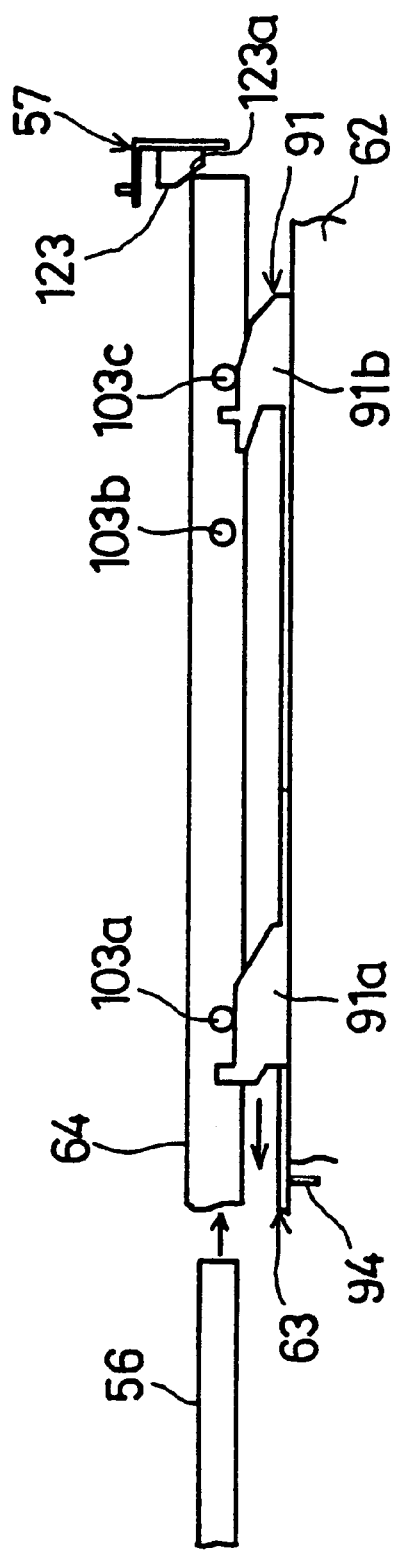
FIGS. 7A and 7B are diagrams for explaining functions of a cam plate of the present embodiment to move up and down a disk holder.
Figure 7B:
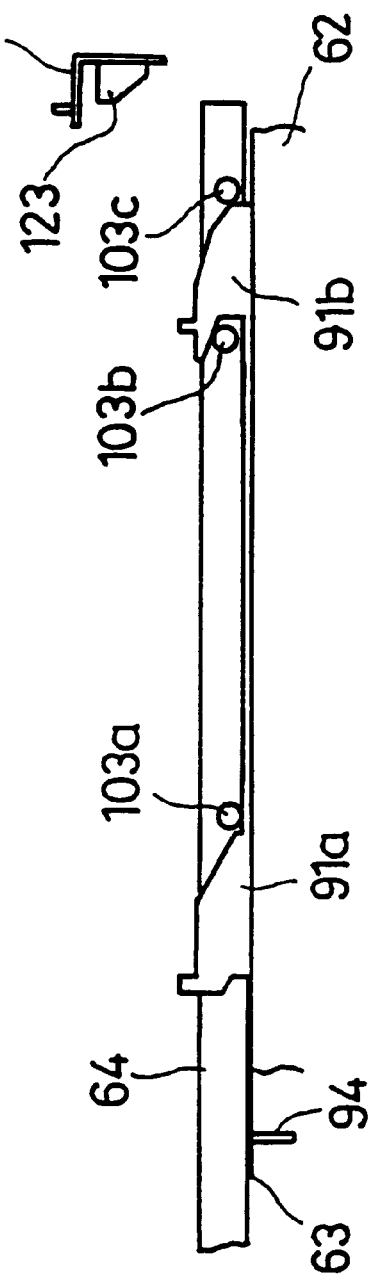
Figure 9A:
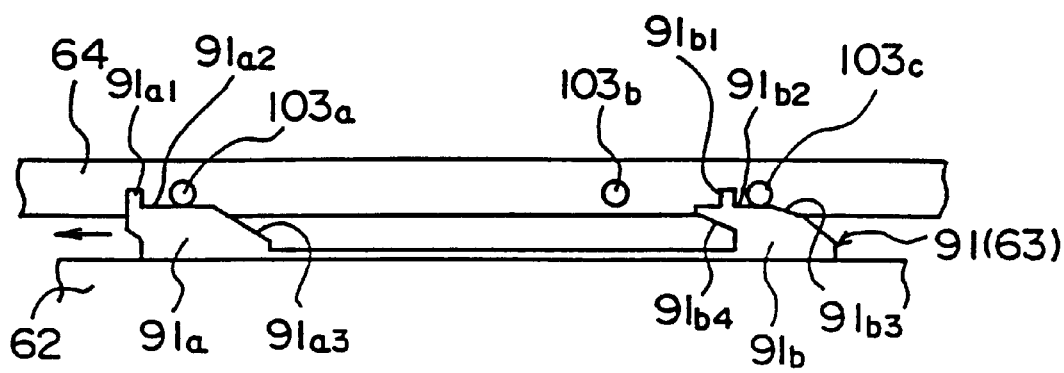
FIGS. 9A and 9B are diagrams showing one side wall of the cam plate when the disk holder is moved down.
Figure 9B:
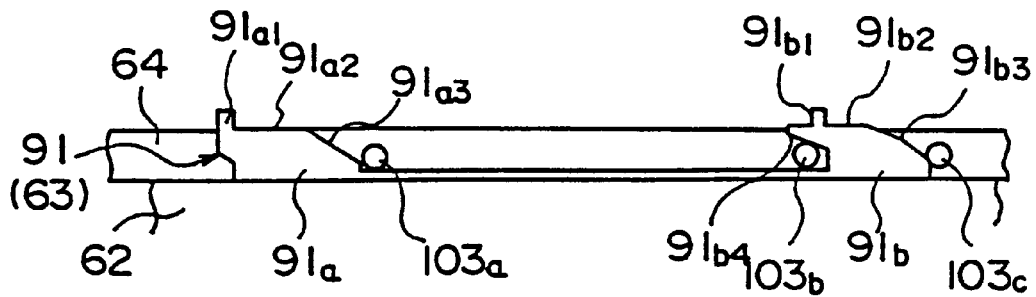
Figure 10A:
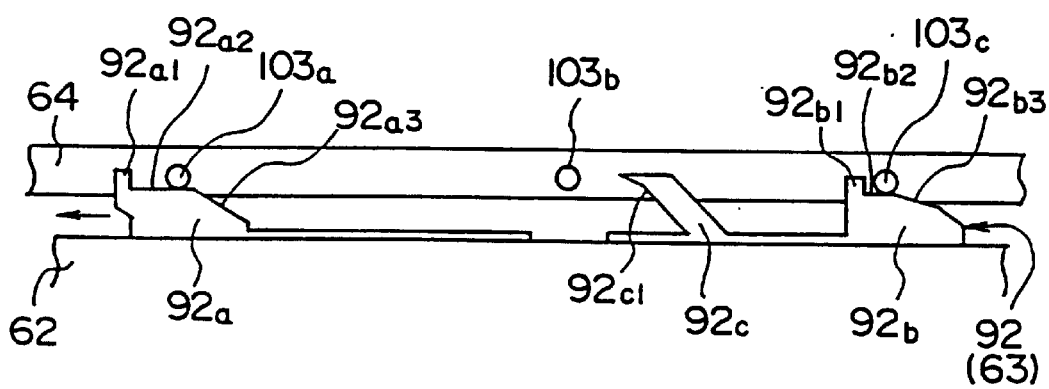
FIGS. 10A and 10B are diagrams showing the opposite side wall of the cam plate when the disk holder is moved down.
Figure 10B:
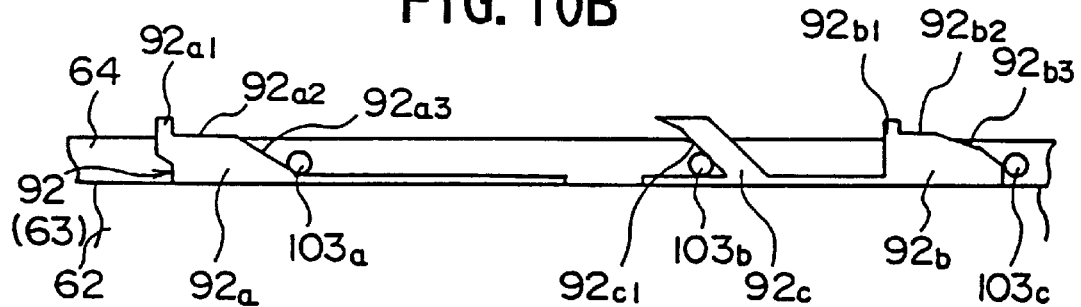

FIGS. 7A and 7B show functions of the cam plate 63 of the present embodiment to move up and down the disk holder 64. FIGS. 9A and 9B show the side wall 91 of the cam plate 63 when the disk holder 64 is moved down. FIGS. 10A and 10B show the opposite side wall 92 of the cam plate 63 when the disk holder 64 is moved down.

As shown in FIG. 7A, when the disk cartridge 56 is inserted into the disk holder 64, the disk holder 64 is at the insert/ejection position. The disk holder 64 at the insert/eject position is arranged above the cam plate 63. The guide pins 103a of the disk holder 64 are contacted by the horizontal regions of the cam portions 91a and 92a, and the guide pins 103c of the disk holder 64 are contacted by the horizontal regions of the cam portions 91b and 92c. The disk holder 64 at the insert/eject position is pulled toward the chassis 71 of the drive unit 62 by the biasing force of the coil spring 105. The biasing force of the coil spring 105 serves to prevent the disk holder 64 from being upwardly separated from the cam plate 63 when the disk holder 64 is at the insert/eject position.

As described above, the cam plate 63 is moved in the direction indicated by the arrow in FIG. 7A when the disk cartridge 56 is inserted into the disk holder 64. Since the cam plate 63 is slid relative to the disk holder 64 in the forward direction, the guide pins 103a of the disk holder 64 are slid on the sloping regions of the cam portions 91a and 92a, and the guide pins 103c of the disk holder 64 are slid on the sloping regions of the cam portions 91b and 92c. The disk holder 64 is moved down to the disk-loaded position along the sloping regions of the cam portions 91a, 92a, 91b and 92c, as shown in FIG. 7B.

In addition, when the disk holder 64 is moved down to the disk-loaded position, the guide pins 103b of the disk holder 64 are contacted by the recessed sloping regions of the cam portions 91b and 92c. Since the drive unit 53 is supported on the casing 52 such that the drive unit 53 is slightly movable in the insert/eject directions, the stopper unit 57 serves to prevent the drive unit 53 from being excessively moved toward the rear end of the casing 52 when the disk cartridge 56 is inserted into the disk holder 64.

As shown in FIG. 7B, when the disk holder 64 is at the disk-loaded position, the upper surfaces of the guide pins 103b of the disk holder 64 are held by the lower surfaces of the recessed sloping regions of the cam portions 91b and 92c of the cam plate 63. Therefore, it is possible to prevent the disk holder 64 from being upwardly separated from the cam plate 63 by an external force when the CD-R 111 is accessed to record information in the disk 111 and/or reproduce information from the disk 111. The disk cartridge 56 held on the disk holder 64 can be stably and firmly supported by the cam plate 63 when the disk holder 64 is at the disk-loaded position.

When automatically ejecting the disk cartridge 56 from the disk device 51, the eject button 60 on the front bezel 58 is depressed by the operator. Since the ejection motor 78 is rotated by the depression of the eject button 60, the main gear 79 is rotated by the rotating force of the ejection motor 78 via the worm gear 78a. The cam portion 79a of the main gear 79 is engaged with the cam plate 63 and moves the cam plate 63 in the rearward direction. Thus, the disk holder 64 is moved up to the insert/eject position by the rearward direction of the cam plate 63, and the disk cartridge 56 on the disk holder 64 is ejected from the disk device 51.

When manually ejecting the disk cartridge 56 from the disk device 51 upon the emergency occasion (such as the malfunction of the ejection motor 78 or the power down of the host computer), a shaft (not shown) is inserted from the ejection hole 61 of the front bezel 58 into the disk device 51 by the operator. The projection 94 of the cam plate 63 is pushed in the rearward direction by the inserted shaft, in order to move up the disk holder 64 from the cam plate 63.

FIGS. 8A and 8B show a manual ejecting operation of the present embodiment to manually eject the disk cartridge 56 from the disk device 51.

As shown in FIG. 8A, before the disk holder 64 is moved up from the cam plate 63, the disk holder 64 is at the disk-loaded position which is the same as the position shown in FIG. 7B. When a shaft (not shown) is inserted from the ejection hole 61 of the front bezel 58 into the disk device 51 by the operator, the projection 94 of the cam plate 63 is pushed in the rearward direction by the inserted shaft. Since the cam plate 63 is moved in the rearward direction by the inserted shaft, the guide pins 103a of the disk holder 64 are slid on the sloping regions of the cam portions 91a and 92a of the cam plate 63, and the guide pins 103c of the disk holder 64 are slid on the sloping regions of the cam portions 91b and 92c of the cam plate 63. Thus, the disk holder 64 is moved relative to the cam plate 63 in the forward direction to the insert/eject position, as shown in FIG. 8B.

When the disk holder 64 is moved from the disk-loaded position to the insert/eject position, the rear end of the disk holder 64 is contacted by the projection 123 of the stopper unit 57. The tapered portion 123a of the projection 123 is configured to guide the upward movement of the disk holder 64.

The above-described emergency ejection mechanism is used upon the emergency occasion only and not frequently used. In the present embodiment, the projection 94 of the cam plate 63 having a simple structure can be used as the emergency ejection mechanism without need for providing a complicated structure. It is possible that the emergency ejection mechanism of the present embodiment provide a reduction of the manufacturing cost for the disk device. In addition, it is possible to widen an internal space of the disk device 11 for installing other parts in the disk device.

In the present embodiment, the stroke of the disk holder 64 between the insert/eject position and the disk-loaded position is reduced by using the stopper unit 57. Thus, it is possible to widen an internal space of the disk device 11 and install vibration absorbing parts in the internal space of the disk device 11. For example, the rubber insulators 86 and 87 are used as the vibration absorbing parts. Since the rubber insulators in the disk device are not influenced by any parts, it is possible to take vibration preventive measures appropriate for the disk device of the present embodiment.

Next, a description will be given of another embodiment of the present invention with reference to FIGS. 11 through 15.

Figure 11:
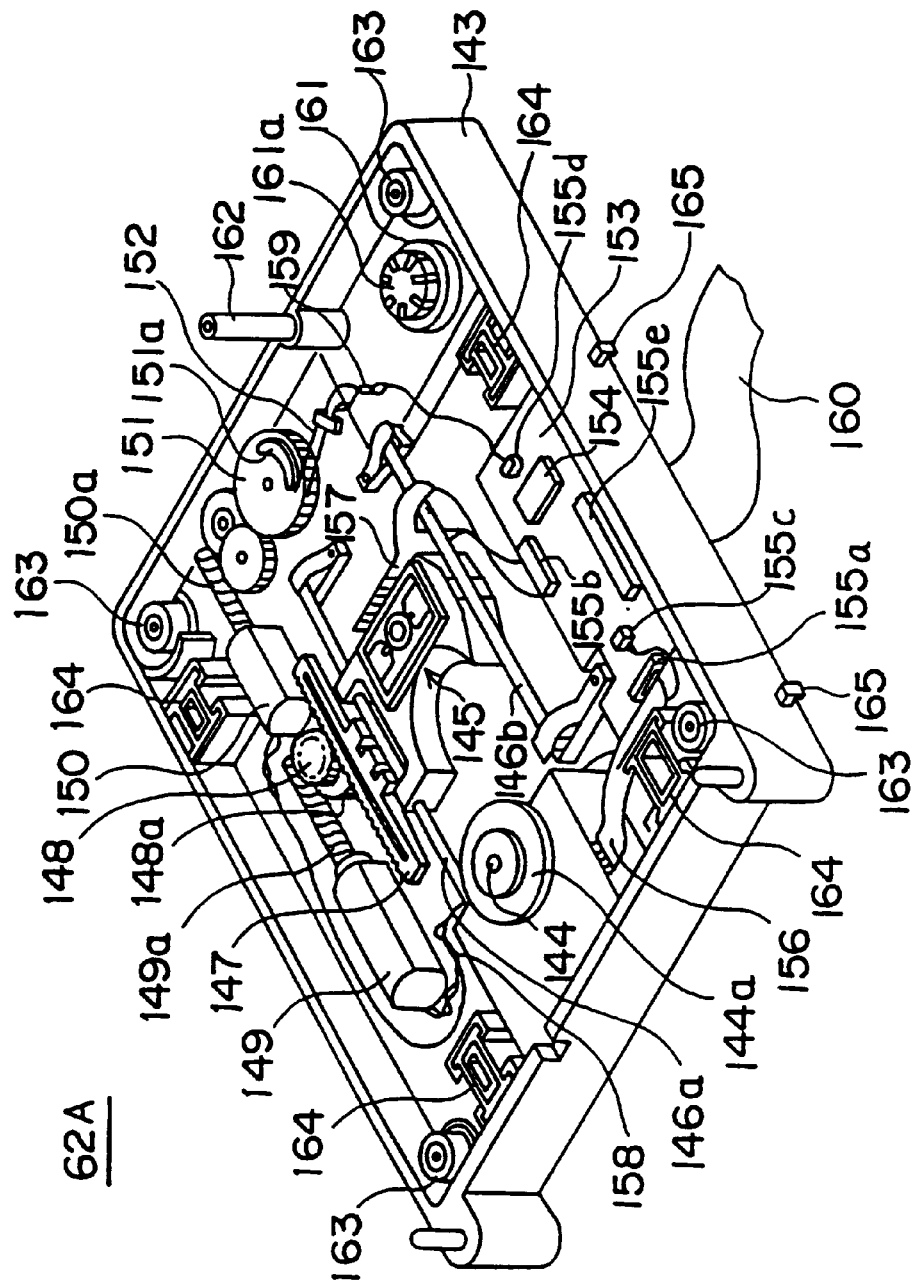
FIG. 11 is a perspective view of a drive unit of a disk device to which another embodiment of the present invention is applied.

FIG. 11 shows a drive unit of a disk device to which another embodiment of the present invention is applied. Similarly to the previous embodiment shown in FIGS. 3 and 4, the disk device of the present embodiment includes a chassis, a drive unit, a main printed circuit board, and a cover plate. The chassis, the main printed circuit board and the cover plate of the present embodiment, which are not shown in FIG. 11, are essentially the same as corresponding elements in FIG. 3, and a description thereof will be omitted.

Referring to FIG. 11, the drive unit of the present embodiment includes a drive mechanism 62A. A disk holder and a cam plate of the disk unit of the present embodiment, which are not shown in FIG. 11, are essentially the same as corresponding elements in FIG. 4, and a description thereof will be omitted.

The drive mechanism 62A, as shown in FIG. 11, includes a chassis 143 of a resin material. A disk motor (not shown) and an optical head 145 are arranged in the chassis 143. A CD-R disk of a disk cartridge 56 (as shown in FIGS. 5A and 5B) is rotated by the disk motor when a disk holder 64 (as shown in FIG. 4) is at the disk-loaded position. The disk is accessed by the optical head 145 to reproduce information from the disk and/or record information in the disk. The disk motor is connected to a spindle 144, and a chuck part 144*a* is attached to the spindle 144 as shown in FIG. 11. The disk cartridge 56 is held by the chuck part 144*a* when the disk holder 64 is at the disk-loaded position.

The optical head 145 is movably supported by a pair of guide rods 146*a* and 146*b*, and the optical head 145 is supported by the guide rods 146*a* and 146*b* such that the optical head 145 is movable in a radial direction of the disk. A rack 147 is fixed to the optical head 145, and the rack 147 is engaged with a gear 148. The gear 148 includes a worm wheel 148*a*. A worm gear 149*a* is fixed to a rotating shaft of a head moving motor 149. The worm wheel 148*a* of the gear 148 is engaged with the worm gear 149*a* of the head moving motor 149. The optical head 145 is moved in the radial direction of the disk by the head moving motor 149 via the worm gear 149*a*, the worm wheel 148*a*, the gear 148 and the rack 147 when the head moving motor 149 is rotated.

An ejection motor 150 is arranged within the chassis 143. A worm gear 150*a* is fixed to the rotating shaft of the ejection motor 150. The worm gear 150*a* is engaged with a main gear 151 via a set of gears. A cam 151*a* is attached to the top of the main gear 151. The cam 151*a* is engaged with a connecting piece 95 of the cam plate (as shown in FIG. 4). Similarly to the previous embodiment, when the ejection motor 150 is rotated, the cam plate is slid in the insert direction by the engagement of the cam 151*a* and the connecting piece 95 in the present embodiment.

A sensing switch 152 is arranged in the vicinity of the cam 151*a*. The sensing switch 152 senses a position of the cam 151*a* of the main gear 151.

A relaying printed circuit board 153 is arranged within the chassis 143 at a side portion of the chassis 143. A pickup amplifier 154 and other parts are packaged in the relaying printed circuit board 153. The relaying printed circuit board 153 includes at least five connectors 155*a* through 155*e*, and the connectors 151*a* through 155*e* are also packaged in the relaying printed circuit board 153.

The disk motor (provided below the spindle 144) is electrically connected to the relaying printed circuit board 153 by a flexible printed circuit cable 156. One end of the flexible printed circuit cable 156 is connected to the disk motor, and the other end thereof is connected to the connector 155*a*. The optical head 145 is electrically connected to the relaying printed circuit board 153 by a flexible printed circuit cable 157. One end of the flexible printed circuit cable 157 is connected to the optical head 145, and the other end thereof is connected to the connector 155*b*.

Cord wires 158 from the head moving motor 149 and the ejection motor 150 are connected to the connector 155*c*. A cord wire 159 from the sensing switch 152 is connected to the connector 155*d*. The connector 155*e* of the relaying printed circuit board 153 is electrically connected to the main printed circuit board by a flexible printed circuit cable 160. As described above, the main printed circuit board is arranged above the drive unit of the present embodiment.

In the present embodiment, all the electrical wires from the drive mechanism 62A within the chassis 143 are connected to the relaying printed circuit board 153, and the relaying printed circuit board 153 and the main printed circuit board are interconnected by the flexible printed circuit cable 160.

Further, in the present embodiment, a damper 161 is arranged at a rear corner portion of the chassis 143. A gear 161*a* is attached to the damper 161. The gear 161*a* is engaged with a rack of the cam plate. Similarly to the previous embodiment, the engagement between the gear 161*a* of the damper 161 and the rack of the cam plate serves to reduce the speed of the sliding movement of the cam plate.

A vertically extending guide shaft 162 is arranged at a rear end wall of the chassis 143 near the damper 161. The guide shaft 162 is loosely fitted to a guide hole of the disk holder. Similarly to the previous embodiment, the upward and downward movements of the disk holder relative to the cam plate are guided by the guide shaft 162.

Four insulators 163 of a resilient material, such as rubber, are arranged at four corner portions of the chassis 143. Each of the insulators 163 has an internal opening. Similarly to the previous embodiment, the casing has four bosses provided at four corner portions of the casing. The drive unit of the present embodiment is arranged within the casing such that the insulators 163 of the chassis 143 are fitted into the bosses of the casing. Since the chassis 143 is attached to the casing via the insulators 163, the insulators 163 serve to absorb vertical vibrations of the drive unit when any impact is given to the disk device.

Four horizontal insulators 164 of a resilient material, such as rubber, are arranged within the chassis 143 in the vicinity of the insulators 163, respectively. Each of the insulators 164 has an internal slot. Similarly to the previous embodiment, the casing has four bosses provided on the casing in the vicinity of the bosses for the insulators 163. The drive unit of the present embodiment is arranged within the casing such that the horizontal insulators 164 are fitted into the above bosses. Since the chassis 143 is attached to the casing via the horizontal insulators 164, the insulators 164 serve to absorb horizontal vibrations of the drive unit when any impact is given to the disk device.

The chassis 143 has a set of lock pieces 165 provided on both sides of the chassis 143. The lock pieces 165 of the present embodiment are the same as the lock pieces 88 of the previous embodiment in FIG. 4.

Figure 12A:
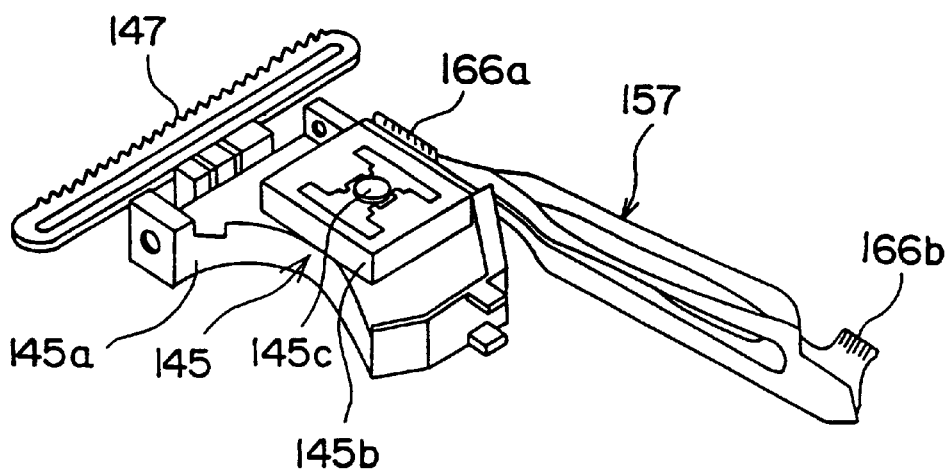
FIGS. 12A and 12B are views of an optical head and a flexible printed circuit cable of the disk device in FIG. 11.
Figure 12B:
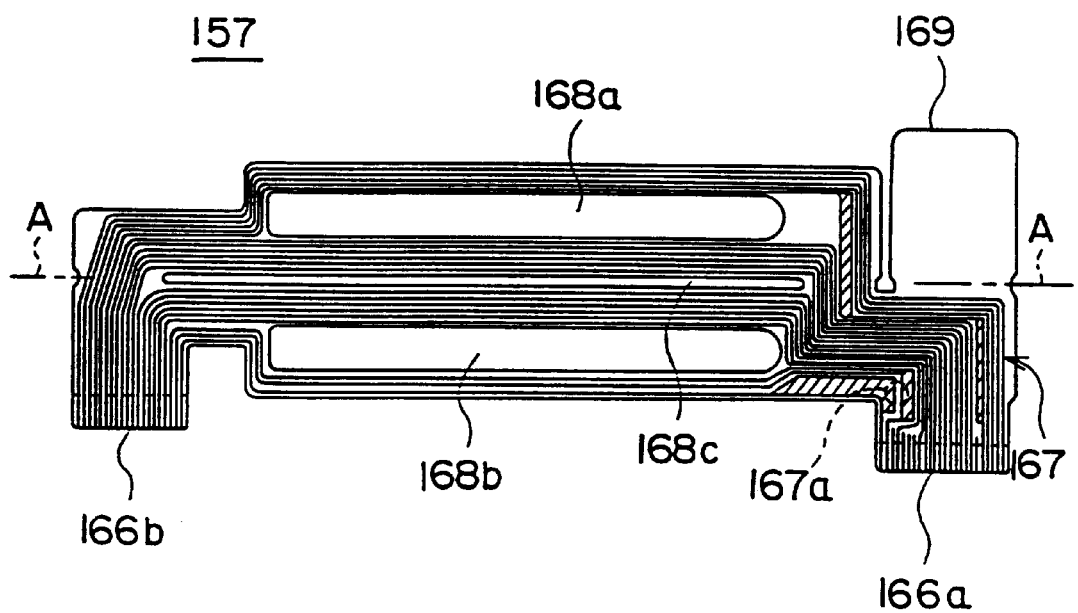

FIGS. 12A and 12B show the optical head 145 and the flexible printed circuit cable 157 of the embodiment in FIG. 11.

As shown in FIG. 12A, the optical head 145 includes a base 145*a* and a pickup part 145*b*. The base 145*a* of the optical head 145 is movably supported by the guide rods 146*a* and 146*b* as shown in FIG. 11. The pickup part 145*b* is mounted on the base 145*a*. The flexible printed circuit cable 157 is arranged in a folded condition, and one end of the flexible printed circuit cable 157 is coupled to the pickup part 145*b*.

In the optical head 145, the pickup part 145*b* includes an objective lens 145*c*, in addition to a laser diode, a beam splitter, a mirror and a photodetector provided therein. Further, a tracking control actuator and a focusing control actuator, which actuate the objective lens 145*c*, are included in the pickup part 145*b*. One end of the flexible printed circuit cable 157 is connected to a terminal board (not shown) of the pickup part 145*b*. Control signals, used to control the laser diode, the photodetector and the actuators, are sent from the flexible printed circuit cable 157 (or from the main printed circuit board) to the pickup part 145*b* via the terminal board.

As shown in FIG. 12B, the flexible printed circuit cable 157 includes a number of wire patterns 167 which are formed in a flexible film. The wire patterns 167 are signal lines through which signals from the optical head 145 and signals from the main printed circuit board are delivered. The flexible printed circuit cable 157 has an end portion 166*a* which is coupled to the optical head 145, and an end portion 166*b* which is coupled to the connector 155*b* of the relaying printed circuit board 153. The flexible printed circuit cable 157 is folded substantially along a center line A—A indicated in FIG. 12B, and the folded line of the flexible printed circuit cable 157 is substantially parallel to the lines of the wire patterns 167. The flexible printed circuit cable 157 in the folded condition is arranged to interconnect the optical head 145 and the relaying printed circuit board 153, as shown in FIG. 11.

As shown in FIG. 12B, the flexible printed circuit cable 157 includes two openings 168*a* and 168*b* which are overlapped to form a single opening when the flexible printed circuit cable 157 is folded along the center line A—A. A mounting portion 169 is integrally formed with the flexible printed circuit cable 157, and the mounting portion 169 is located in the vicinity of the end portion 166*a*. An adhesive agent is applied to the mounting portion 169, and the flexible printed circuit cable 157 is fixed to the optical head 145 by using the mounting portion 169.

Further, the flexible printed circuit cable 157 includes a narrow opening 168*c* substantially along the center line A—A, and, in the narrow opening 168*c*, no wire pattern is formed. The narrow opening 168*c* facilitates the folding of the flexible printed circuit cable 157 along the center line A—A.

The flexible printed circuit cable 157 is folded along the center line A—A in FIG. 12B when it is arranged within the chassis 143. The flexible printed circuit cable 157 in the folded condition is fixed to the optical head 145 by attaching the mounting portion 169 to the optical head 145, such that the end portion 166*a* is coupled to the terminal board of the optical head 145. Thus, the optical head 145 and the flexible printed circuit cable 157 are arranged in a manner as shown in FIG. 12A. As shown in FIG. 11, the guide rod 146*b* passes through the openings 168*a* and 168*b* of the flexible printed circuit cable 157 when the flexible printed circuit cable 157 is fixed to the optical head 145. Since the guide rod 146*b* and the flexible printed circuit cable 157 do not interfere with each other, the movement of the optical head 145 along the guide rods 146*a* and 146*b* is not influenced by the flexible printed circuit cable 157. The other end portion 166*b* of the flexible printed circuit cable 157 is coupled to the connector 155*b* of the relaying printed circuit board 153.

As shown in FIG. 12B, the flexible printed circuit cable 157 includes a short land 167*a* in the wire patterns 167. The wire pattern 167 related to the short land 167*a* is connected to the laser diode of the optical head 145. During assembly, a soldering is attached to the short land 167*a* so that the laser diode is in a short-circuit condition. This prevents the laser diode of the optical head 145 from being damaged or broken due to static electricity during assembly. After the assembly is completed, the soldering is removed from the flexible printed circuit cable 157.

Since the flexible printed circuit cable 157 in the folded condition is arranged in the present embodiment, the internal space to install the number of the required signal lines is widened. The interval between the signal lines included in the flexible printed circuit cable 157 can be enlarged, and the noise resistance of the flexible printed circuit cable 157 can be increased. The signal lines included in the flexible printed circuit cable 157 can be divided by the openings 168*a* and 168*b* into a power supply group and a data signal group. The noise resistance of the flexible printed circuit cable 157 can be further increased.

FIG. 13 shows another flexible printed circuit cable 157A which can be used by the optical head 145 in FIG. 11.

The flexible printed circuit cable 157A in FIG. 13 is used by the optical head 145 of the present embodiment, similarly to the flexible printed circuit 157 in FIG. 12B.

The flexible printed circuit cable 157A includes a number of wire patterns 167 required for the optical head 145 to reproduce and/or record information for the recording disk. The wire patterns 167 include first wire patterns 167*b* and second wire patterns 167*c* which are overlapped when the flexible printed circuit cable 157A is folded along the center line A—A. As shown in FIG. 13, the first wire patterns 167*b* and the second wire patterns 167*c* are slightly slanted in the same directions with respect to the center line A—A. The wire patterns 167*b* and 167*c* are, for example, signal lines used for the photodetector of the optical head 145.

Accordingly, when the flexible printed circuit cable 157A is folded along the center line A—A, the slanting directions of the first wire patterns 167*b* and the second wire patterns 167*c* become opposite to each other, and the first wire patterns 167*b* and the second wire patterns 167*c* intersect each other. Thus, it is possible to reduce the electrostatic capacity of the wire patterns 167*b* and 167*c*.

The flexible printed circuit cable 157A further includes third wire patterns 167*e* and fourth wire patterns 167*f*. The third wire patterns 167*e* are signal lines through which current needed to drive the focusing control actuator and the tracking control actuator in the optical head 145 is supplied. The fourth wire patterns 167*f* are signal lines through which current needed to drive the laser diode in the optical head 145 is supplied.

The flexible printed circuit cable 157A includes two openings 168*a* and 168*b* which are overlapped to form a single opening when the flexible printed circuit cable 157A is folded along the center line A—A. A mounting portion 169 is integrally formed with the flexible printed circuit cable 157A, and the mounting portion 169 is located in the vicinity of the end portion 166a.

The flexible printed circuit cable 157A includes a narrow opening 168c substantially along the center line A—A, and, in the narrow opening 168c, no wire pattern is formed. The narrow opening 168c facilitates the folding of the flexible printed circuit cable 157A along the center line A—A.

As shown in FIG. 13, the flexible printed circuit cable 157A includes a short land 167a in the wire patterns 167. The wire pattern 167 related to the short land 167a is connected to the laser diode of the optical head 145.

Figure 14:
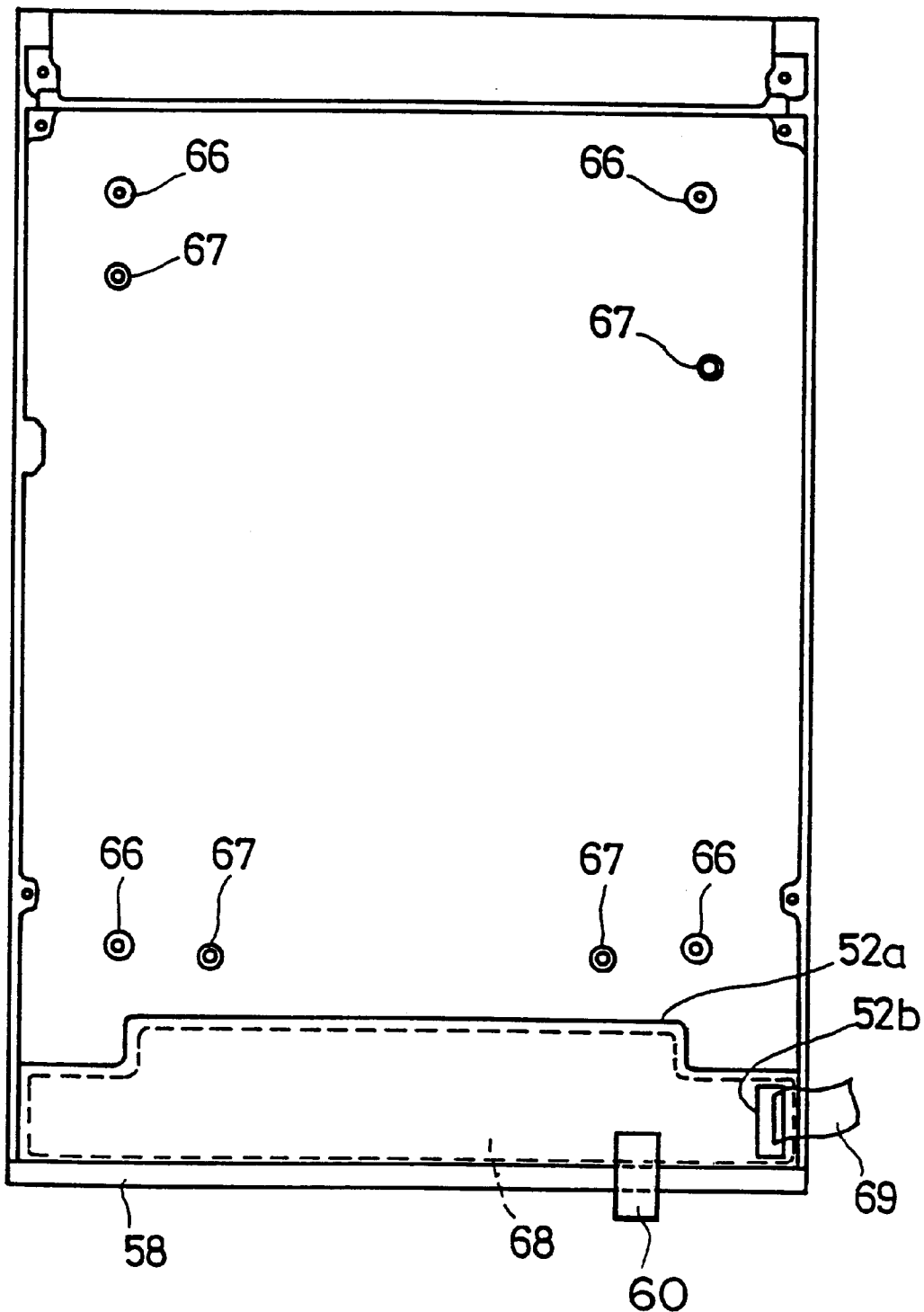
FIG. 14 is a top view of a casing of the disk device in FIG. 3 in which an additional printed circuit board is included.

FIG. 14 shows a casing of the disk device 51 in FIG. 3 in which an additional printed circuit board 68 is included.

As shown in FIG. 14, the casing 52 includes a stepped portion 52a at a front portion of the casing 52. The additional printed circuit board 68 is arranged on the stepped portion 52a of the casing 52.

As described above, in the front bezel 58 of the disk device 51, an indicator, a volume control and a phone terminal are additionally arranged as required. The additional printed circuit board 68 including the eject button 60 and other electrical parts is arranged at a rear portion of the front bezel 58.

The additional printed circuit board 68 in the present embodiment is an audio printed circuit board in which the eject button 60, the indicator, the volume control, the phone terminal (which are arranged on the front bezel 58), and an audio amplifier and other audio-related parts (which are related to optional audio functions of the disk device 51) are included.

The additional printed circuit board 68 is removable from the disk device 51 for replacement. When the optional audio functions are not required for the disk device 51, the additional printed circuit board 68 includes the eject button 60, the indicator and the other electrical parts (which are arranged on the front bezel 58) only.

In the casing 52, as shown in FIG. 14, an opening 52b is formed at a side end of the stepped portion 52a. A flexible printed circuit cable 69 is passed through the opening 52b, and the flexible printed circuit cable 69 interconnects the additional printed circuit board 68 on the casing 52 and the main printed circuit board 54 above the drive mechanism 62. Thus, the electrical parts on the additional printed circuit board 68 are electrically coupled to the main printed circuit board 54 via the flexible printed circuit cable 69.

FIG. 15 shows an arrangement of the main printed circuit board 54, the relaying printed circuit board 80 and the additional printed circuit board 68 in the disk device 51 in FIG. 3.

As shown in FIG. 15, the main printed circuit board 54 is arranged above the drive unit 53 (including the drive mechanism 62) at a height that is at the upper portion of the casing 52 (or the disk device 51). The relaying printed circuit board 80 is arranged within the drive mechanism 62 (included in the drive unit 53) at a height that is at the middle portion of the casing 52. The additional printed circuit board 68 is arranged at the rear portion of the front bezel 58 of the disk device 51 at a height that is at the lower portion of the casing 52.

Generally, in the case of the CD-R disk device, the control circuit of the main printed circuit board 54 becomes complicated and a small-height structure of the disk device is desired. In the present embodiment, the internal space of the disk device 51 is widened by the improved emergency ejection mechanism and the improved flexible printed circuit cable, and the total area of the printed circuit boards 54, 68 and 80 is increased. It is possible to easily perform adjustments and maintenance work of the internal parts of the disk device 51. By the maintenance work, several characteristics of the disk device 51 after the manufacture are checked.

Since the main printed circuit board 54 is arranged above the drive unit 53, the maintenance work for the disk device 51 is easily performed by removing the cover plate 55. Since the relaying printed circuit board 80 includes all the required signal lines from the drive unit 53, the maintenance work for a subassembly including the relaying printed circuit board 80 before installed on the disk device 51 can be easily performed. Also, the wiring of all the required signal lines within the chassis 71 can be easily performed because of the relaying printed circuit board 80. The additional printed circuit board 68 is always removable from the disk device 51 for replacement by detaching the front bezel 58 from the casing 52. Thus, the maintenance work for the additional printed circuit board 68 can be easily performed.

Next, a description will be given of various embodiments of improved vibration absorbing parts included in the disk device 51 in FIG. 11, with reference to FIGS. 16A through 23B.

Figure 16A:
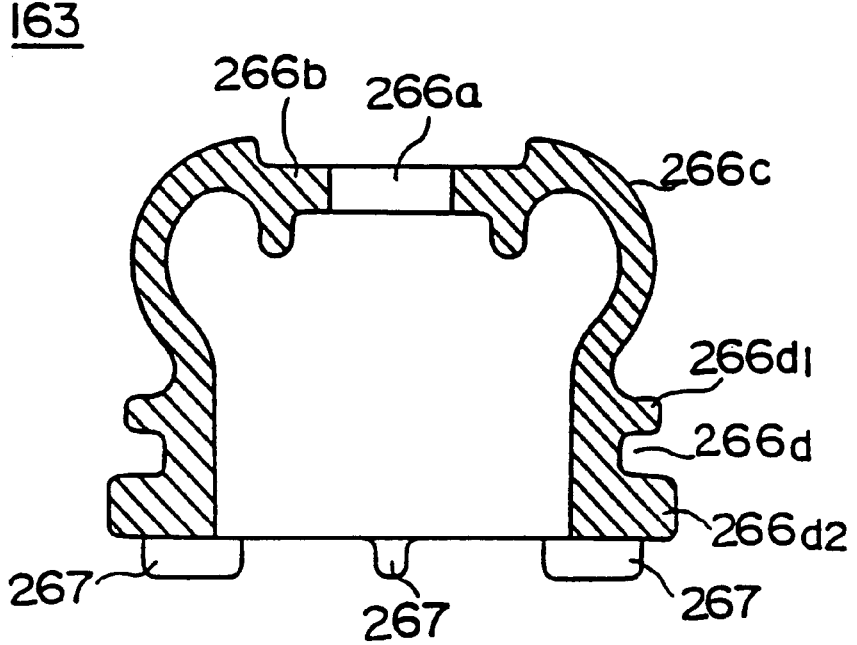
FIGS. 16A and 16B are views of one embodiment of improved vibration absorbing parts of the disk device in FIG. 11.
Figure 16B:
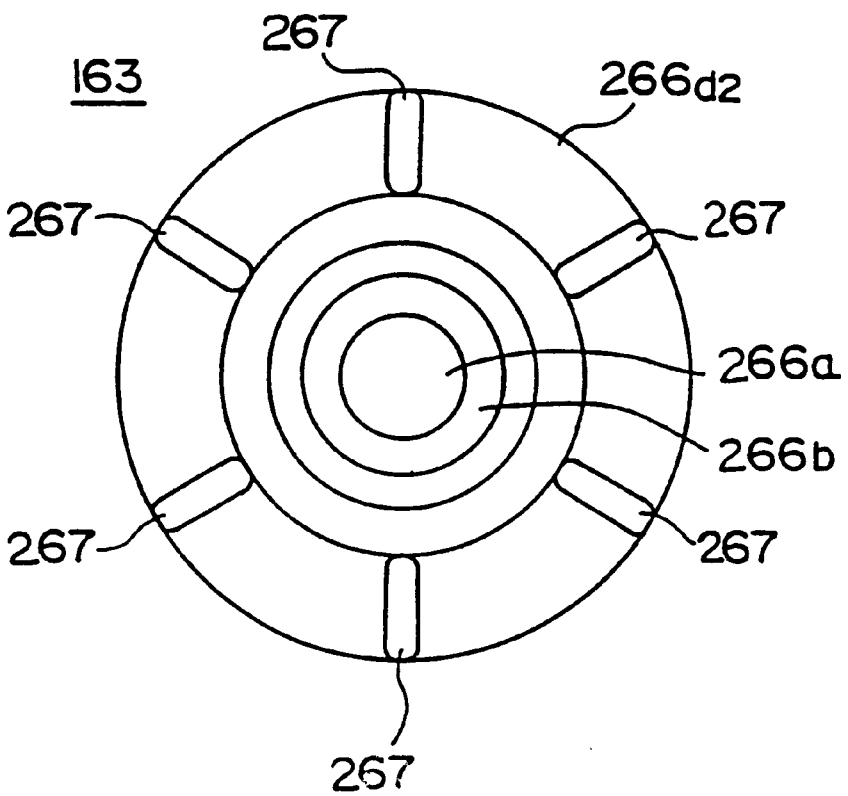

FIGS. 16A and 16B show one embodiment of one of improved vibration absorbing parts 163 of the disk device 51 in FIG. 11. FIG. 16A is a cross-sectional view of the insulator 163 shown in FIG. 11, and FIG. 16B is a bottom view of the insulator 163.

As shown in FIG. 16A, the insulator 163 is a hollow member of a resilient material such as rubber. The insulator 163 has a generally circular cross-section in a horizontal plane. The insulator 163 includes a central hole 266a, a fixed portion 266b and a curve portion 266c which are in an upper half region of the insulator 163. The central hole 266a is formed on the center of the insulator 163, and the periphery of the central hole 266a is surrounded by the fixed portion 266b. The curved portion 266c outwardly projects from the fixed portion 266b.

The insulator 163 includes in its lower half region a mounting groove 266d which is annularly formed below the curved portion 266c. Outwardly projecting flange portions 266d1 and 266d2 are formed above and below the mounting groove 266d. The mounting groove 266d of the insulator 163 is fitted to a periphery of a mounting hole (not shown) of the chassis 143 of the drive mechanism 62A, so that the insulator 163 is mounted on the chassis 143.

As shown in FIG. 16B, a number of radially extending buffer pieces 267 are attached to the bottom of the insulator 163. The buffer pieces 267 in the present embodiment are made of a resilient material which is the same as the material of the insulator 163. The insulator 163 and the buffer pieces 267 are integrally formed. The buffer pieces 267 on the bottom of the insulator 163 are brought into contact with a casing 171 (which will be described later) of the disk device 51, and the buffer pieces 267 are resiliently deformable so that they serve as shock absorbing elements of the drive mechanism 62A.

When the insulator 163 is mounted on the chassis 143 of the drive mechanism 62A, the chassis 143 is lifted from (not in contact with) the casing 171 of the disk device 51 by the buffer pieces 267. Even if the drive mechanism 62A is vibrated in a degree that the chassis 143 does not contact the casing 171 take place, the curved portion 266c of the insulator 163 serves to absorb the vibration of the drive mechanism 62A.

As described above, the insulator 163 is provided with the radially extending buffer pieces 267 on the bottom of the insulator 163, and, if one of the buffer pieces 267 is not in contact with the casing 171 of the disk device 51, the other buffer pieces 267 are in contact with the casing 171 of the disk device 51. Thus, it is possible that the insulator 163 stably and efficiently prevents the vibrations of the drive mechanism 62A when an impact is given to the disk device 51.

Figure 17A:
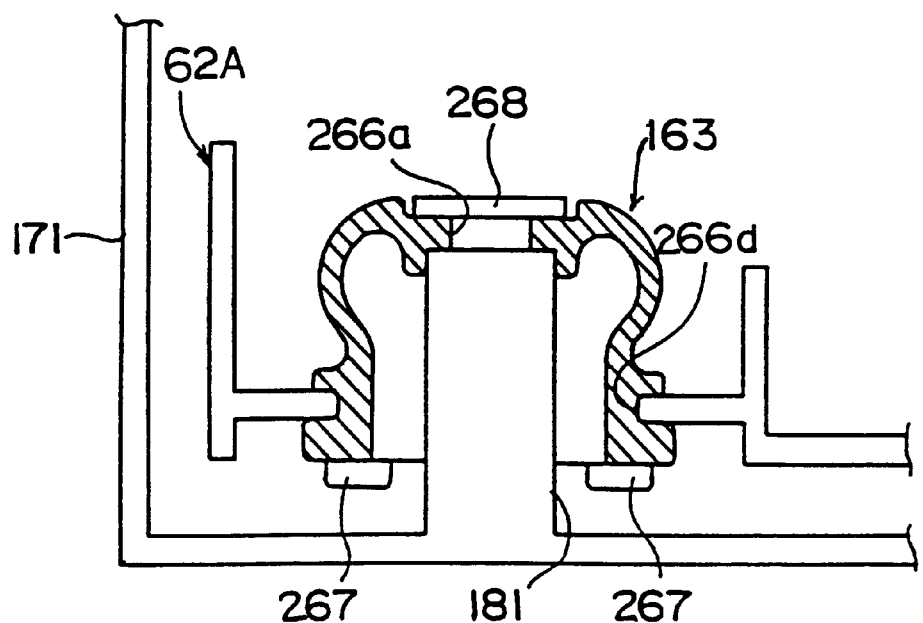
FIGS. 17A and 17B are diagrams showing conditions of the vibration absorbing part in FIGS. 16A and 16B.
Figure 17B:
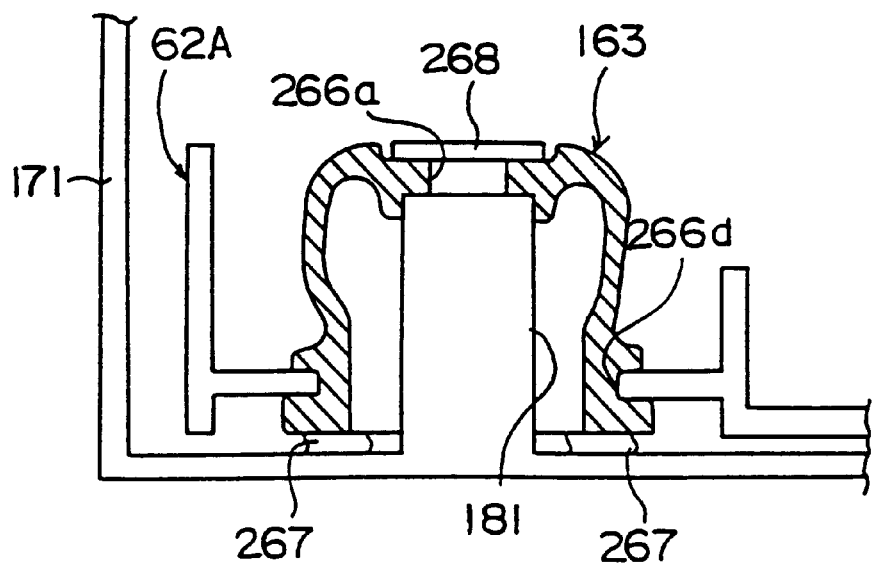

FIGS. 17A and 17B show conditions of the vibration absorbing part 163 in FIGS. 16A and 16B, which is mounted on the drive mechanism 62A of the disk device 51 in FIG. 11.

Mounting holes for the insulators 163 are formed at four corner portions of the chassis 143 of the drive mechanism 62A. As shown in FIG. 17A, the mounting groove 266d of the insulator 163 is fitted to the periphery of one of the mounting holes of the chassis 143 of the drive mechanism 62A. It should be noted that the chassis 143 has a raised bottom wall at each of the four corner portions of the chassis 143, as shown in FIG. 17A, in order to provide a small-height structure for the disk device 51. The central hole 266a of the insulator 163 is inserted into one of four bosses 181 of the casing 171 of the disk device 51. The bosses 181 for the insulators 163 are formed at four corner portions of the casing 171 at positions corresponding to the mounting holes of the chassis 143. One of four screws 268 for the insulators 163 is inserted into the central hole 266a of the insulator 163 and fastened to the boss 181. The fixed portion 266b of the insulator 163 is fixed onto the boss 181 by the screw 268, and the insulator 163 is fixed to the casing 171.

The four insulators 163 are fixed to the casing 171 at the four corner portions of the chassis 143 (the drive mechanism 62A). When the drive mechanism 62A is not vibrated, the bottom of the chassis 143 is, as shown in FIG. 17A, not in contact with the casing 171.

FIG. 17B shows a condition of the insulator 163 on the drive mechanism 62A of the disk device 51 when the drive mechanism 62A is vertically vibrated. As shown in FIG. 17B, the buffer pieces 267 on the bottom of the insulator 163 are brought into contact with the casing 171. As described above, the buffer pieces 267 at this time are resiliently deformed so that the buffer pieces 267 serve as shock absorbing elements of the drive mechanism 62A.

Even if the drive mechanism 62A is vibrated when the disk device 51 records information in the CD-R disk, the insulators 163 (with the buffer pieces 167) stably and efficiently prevent the vibrations of the drive mechanism 62A. The disk device 51 of the present embodiment makes it possible to reduce the internal space between the casing 171 of the disk device and the chassis 143 of the drive mechanism 62A. Therefore, the disk device 51 of the present embodiment can provide a small-height structure for the disk device in which the improved vibration absorbing parts are included. Further, it is possible to avoid occurrence of a write error to the CD-R disk due to the vibrations of the drive mechanism 62A.

Figure 18A:
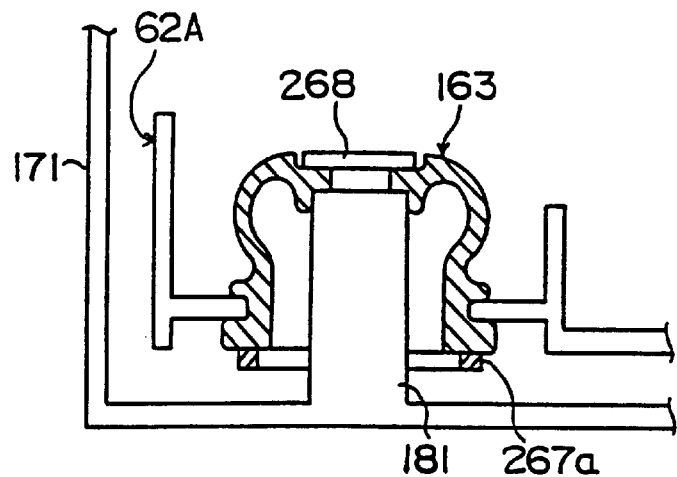
FIGS. 18A, 18B and 18C are views of other embodiments of vibration absorbing parts of the disk device in FIG. 11.
Figure 18B:
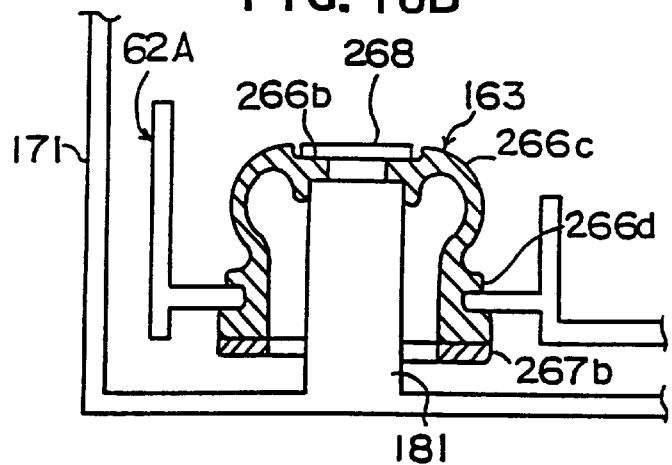
Figure 18C:
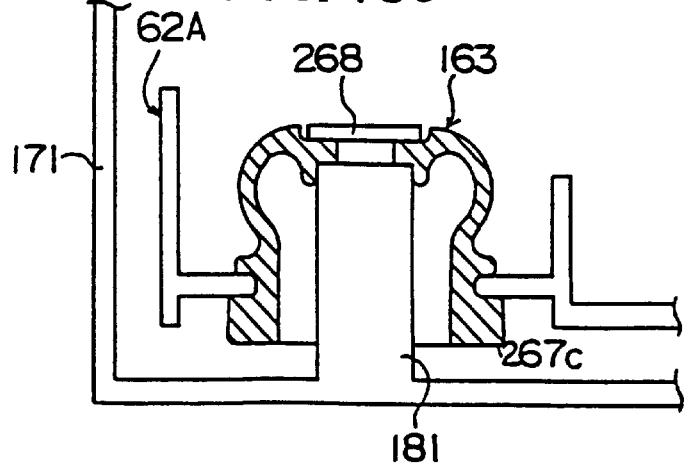

FIGS. 18A, 18B and 18C show other embodiments of the vibration absorbing parts 163 of the disk device 51 in FIG. 11.

FIG. 18A shows an insulator 163 which is different from the insulator 163 in FIGS. 16A and 16B. The insulator 163, shown in FIG. 18A, includes an annular buffer piece 267a attached to the bottom of the insulator 163. The annular buffer piece 267a of the insulator 163 in the present embodiment serves as the shock absorbing element of the drive mechanism 62A, similarly to the radially extending buffer pieces 267 of the insulator 163 in FIGS. 16A and 16B. Alternatively, the insulator 163 in the present embodiment may include a plurality of annular buffer pieces, although the insulator 163 in FIG. 18A includes only one annular piece 267a.

FIG. 18B shows another insulator 163 which is different from the insulator 163 in FIGS. 6A and 16B. The insulator 163, shown in FIG. 18B, includes a buffer piece 267b which has an elastic coefficient different from that of the body (the fixed portion 267b, the curved portion 266c or the mounting groove 266d) of the insulator 163. The buffer piece 267b is attached to the bottom of the insulator 163 by using an adhesive agent. The buffer piece 267b of the insulator 163 in the present embodiment serves as the shock absorbing element of the drive mechanism 62A, similarly to the buffer pieces 267 of the insulator 163 in FIGS. 16A and 16B. It is desirable that the buffer piece 267b of the insulator 163 in the present embodiment has an elastic coefficient smaller than the elastic coefficient of the buffer pieces 267 in FIGS. 16A and 16B.

FIG. 18C shows still another insulator 163 which is different from the insulator 163 in FIGS. 16A and 16B. The insulator 163, shown in FIG. 18C, includes an extended portion 267c which continuously extends from the body of the insulator 163. The extended portion 267c of the insulator 163 in the present embodiment serves as the shock absorbing element of the drive mechanism 62A, similarly to the buffer pieces 267 of the insulator 163 in FIGS. 16A and 16B. Since the extended portion 267c is of the same material of the body of the insulator 163, the vibration preventive characteristic of the extended portion 267c depends on the elastic coefficient of the material of the insulator 163. The extended portion 267c of the insulator 163 of the present embodiment serves to prevent an undesired noise from being produced even if the drive mechanism 62A is greatly vibrated.

Figure 19A:
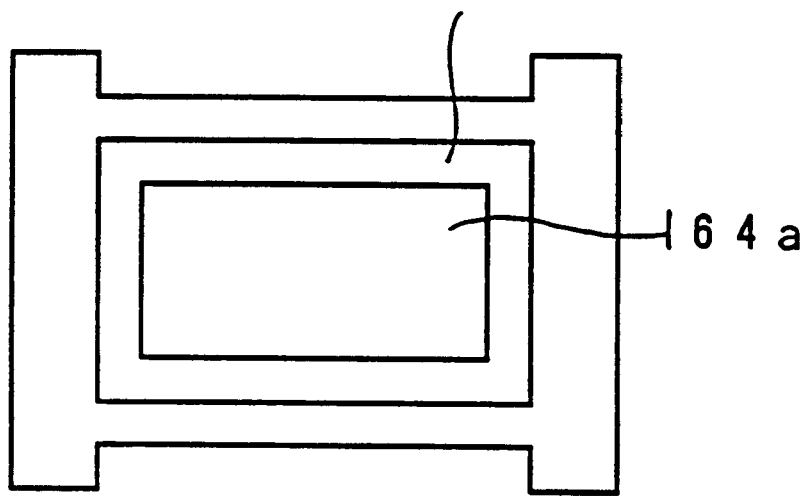
FIGS. 19A and 19B are views of one of horizontal insulators of the disk device in FIG. 11.
Figure 19B:
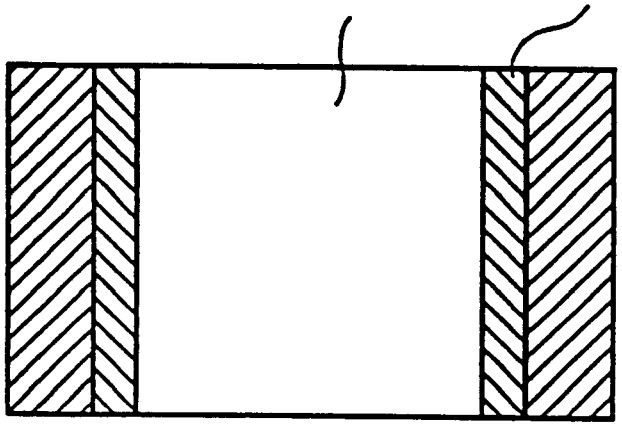

FIGS. 19A and 19B show one of the horizontal insulators 164 of the disk device 51 in FIG. 11. FIG. 19A is a top view of the horizontal insulator 164 of the disk device 51, and FIG. 19B is a cross-sectional view of the horizontal insulator 164.

As shown in FIG. 19A, the horizontal insulator 164 is a hollow member of a resilient material such as rubber. The insulator 164 has a generally rectangular circular cross-section. The insulator 164 includes a rectangular central hole 164a, and a rectangular resin member 165 fitted in the rectangular hole 164a. The rectangular resin member 165 is a hollow member of a resin material. As shown in FIG. 19B, the central hole 164a is formed on the center of the insulator 163, and the rectangular periphery of the central hole 164a is surrounded by the resin member 165.

Similarly to the casing 52 of the disk device in FIG. 3, the casing 171 of the disk device of the present embodiment has the four bosses 181 at four corner portions of the casing 171. The drive unit (including the drive mechanism 62A) of the present embodiment is arranged within the casing 171 such that the insulators 163 of the chassis 143 are fitted into the bosses 181 by the screws 168. Since the chassis 143 is attached to the casing 171 via the insulators 163, the insulators 163 serve to absorb vertical vibrations of the drive unit when any impact is given to the drive mechanism 62A.

Similarly to the casing 52 of the disk device in FIG. 3, the casing 171 has four bosses 182 at four portions of the casing 171 in the vicinity of the bosses 181. The drive unit of the present embodiment is arranged within the casing 171 such that the horizontal insulators 164 are loosely fitted into the bosses 182 of the chassis 143. The resin members 165 of the horizontal insulators 164 are brought into contact with the bosses 182. Since the chassis 143 of the drive mechanism 62A is attached to the casing 171 via the horizontal insulators 164, the insulators 164 serve to absorb horizontal vibrations of the drive unit 53 when any impact is given to the disk device 51. However, since the resin members 165 of the insulators 164 are loosely fitted into the bosses 182 of the casing 171, the insulators 164 and the bosses 182 are slightly movable in longitudinal horizontal directions of the disk device relative to each other. This serves to prevent the horizontal insulators 165 from being fixed to the bosses 182 of the casing 171.

Figure 20:
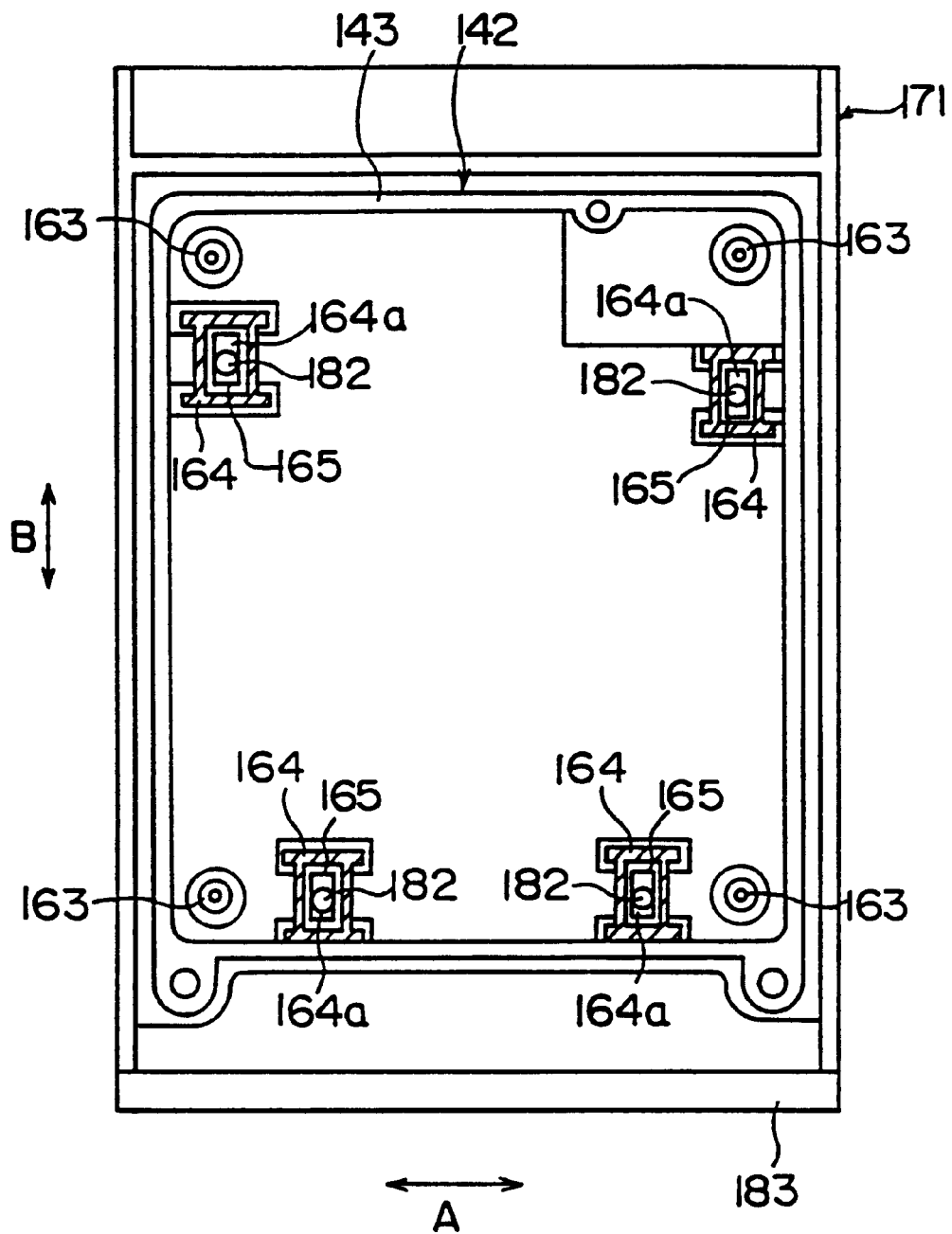
FIG. 20 is a top view of the vibration absorbing parts on the drive unit of the disk device in FIG. 11.

FIG. 20 shows the improved vibrations absorbing parts 163 and 164 arranged on the drive unit (the drive mechanism 62A) of the disk device of the present embodiment in FIG. 11.

As shown in FIG. 20, the drive unit (the drive mechanism 62A) of the present embodiment is arranged within the casing 171 of the disk device. The insulators 163 are fitted to the bosses 181 of the casing 171 by the screws 168, and the resin members 165 of the horizontal insulators 164 are loosely fitted to the bosses 182 of the casing 171.

When the disk device of the present embodiment is installed in a horizontal attitude, the insulators 163 serve to absorb vertical vibrations of the drive mechanism 62A. The insulators 163 serve to absorb horizontal vibrations of the drive mechanism 62A in directions indicated by arrows "A" and "B" in FIG. 20. Further, since the horizontal movements of the bosses 182 of the casing 171 in the directions "A" are restricted by the resin members 165 of the horizontal insulators 164, the horizontal insulators 164 serve to absorb the horizontal vibrations of the drive mechanism 62A in the directions "A".

On the other hand, when the disk device of the present embodiment is installed in a vertical attitude (or it stands on one side of the casing 171), the movements of the bosses 182 of the casing 171 in the directions "A" are restricted by the resin members 165 of the insulators 164. Similarly to the above horizontal case, the insulators 163 and the insulators 164 serve to absorb vertical and horizontal vibrations of the drive mechanism 62A.

Figure 1:
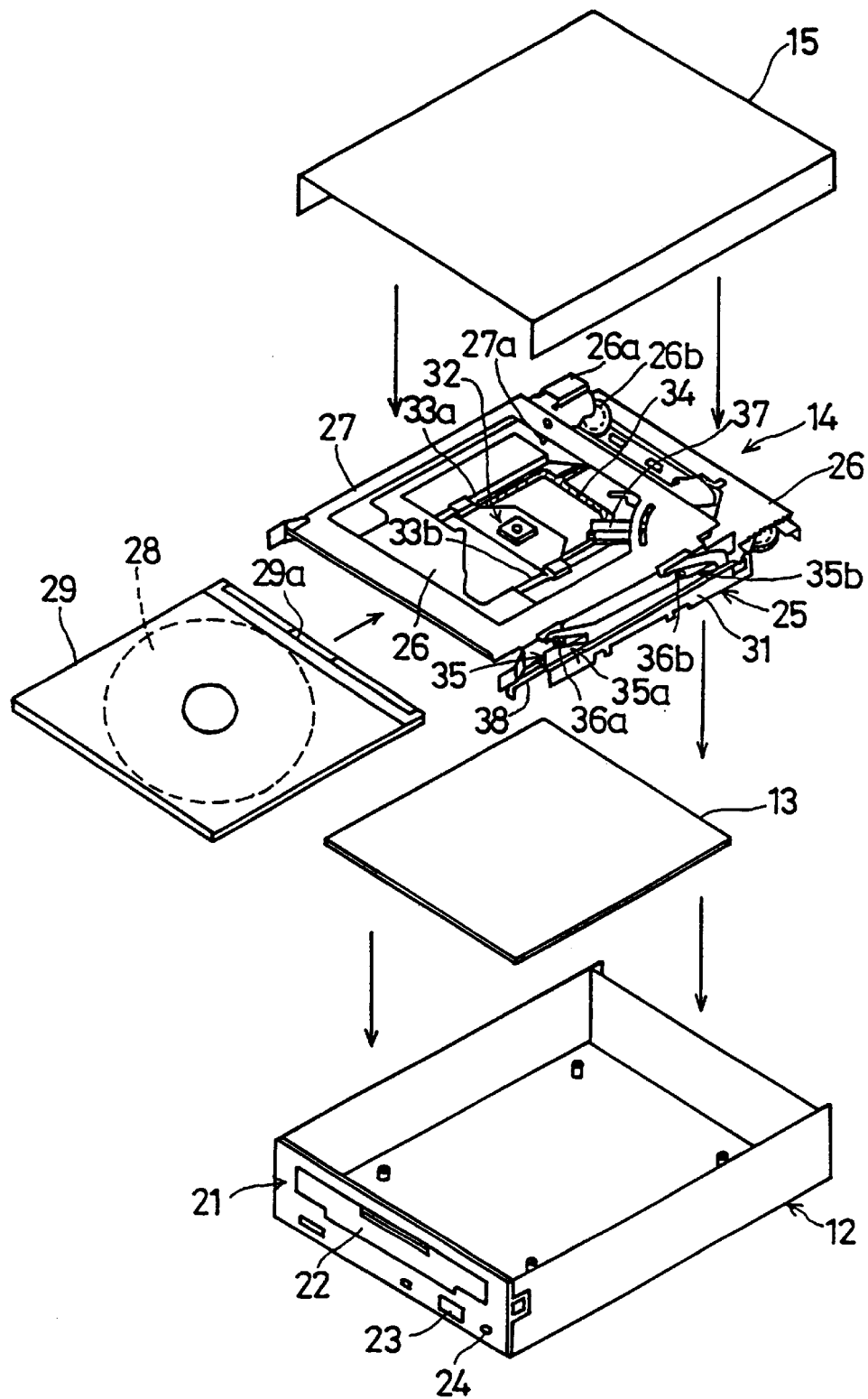
FIG. 1 is an exploded perspective view of a conventional disk device having an emergency ejection mechanism.
Figure 2A:
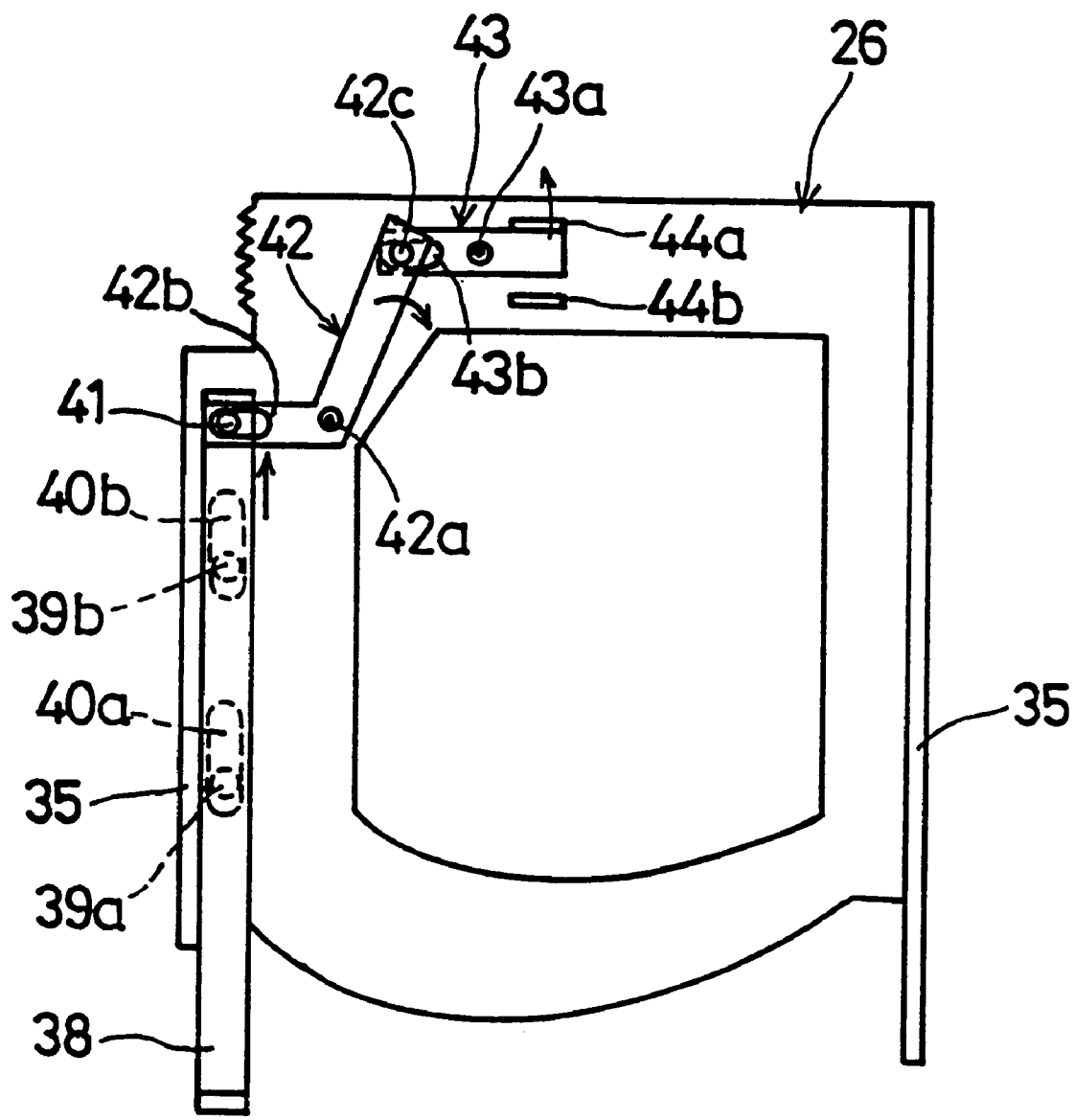
FIG. 2A is a bottom view of a slider of the conventional disk device in FIG. 1.
Figure 2B:
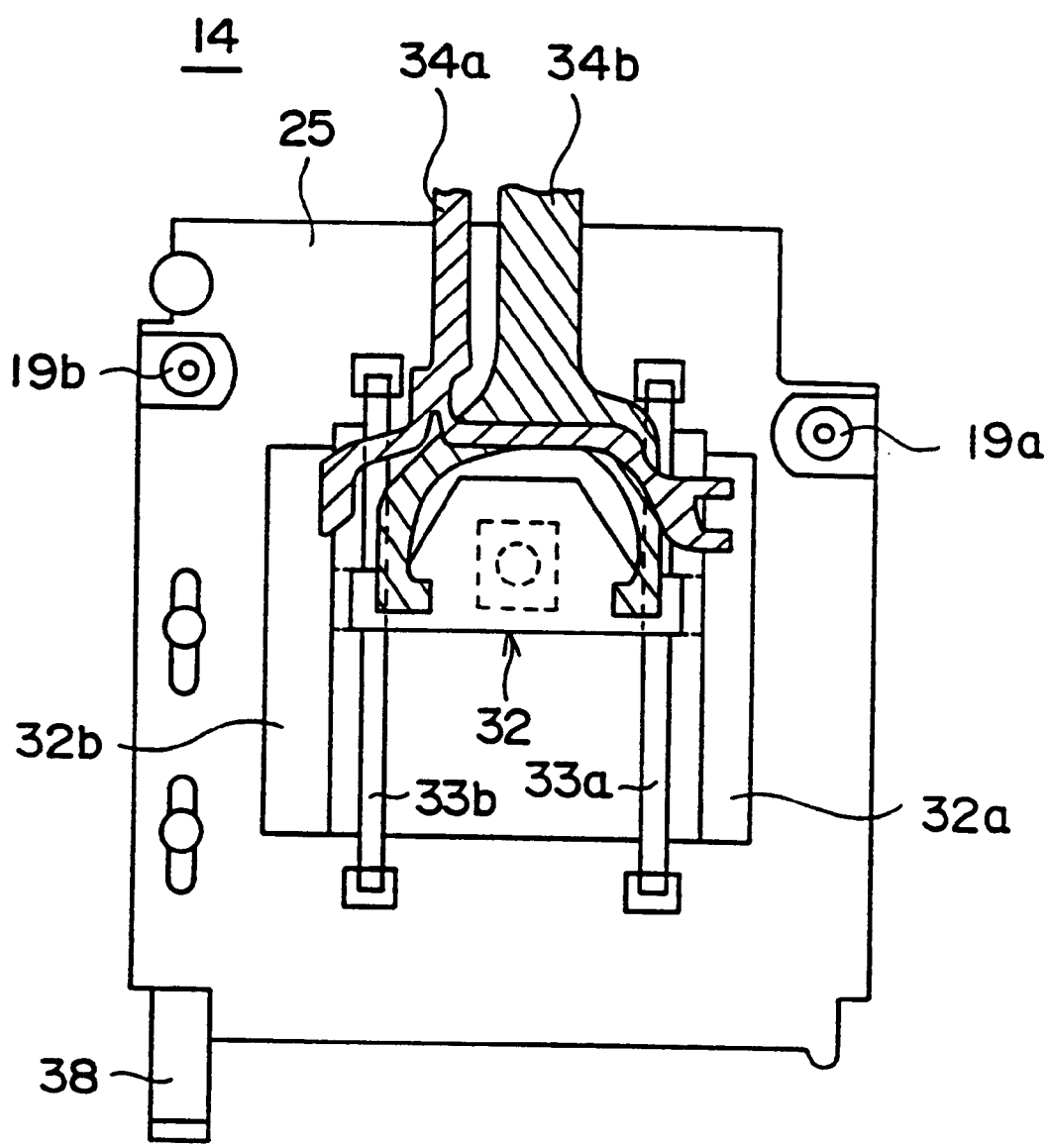
FIG. 2B is a bottom view of a drive unit of the conventional disk device in FIG. 1.
Figure 2C:
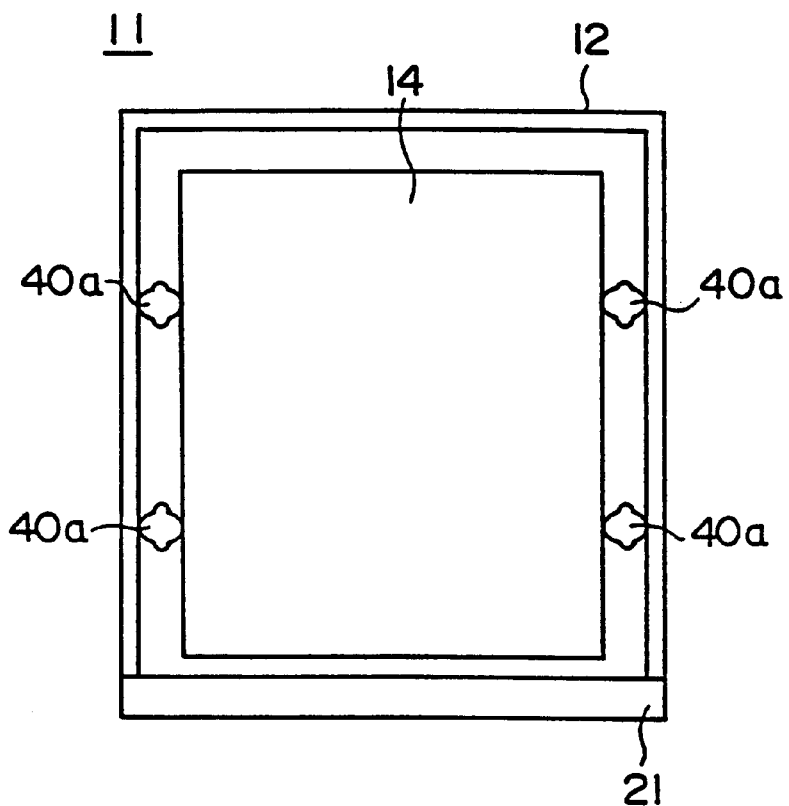
FIGS. 2C and 2D are diagrams showing vibration absorbing members of the conventional disk device in FIG. 1.
Figure 2D:
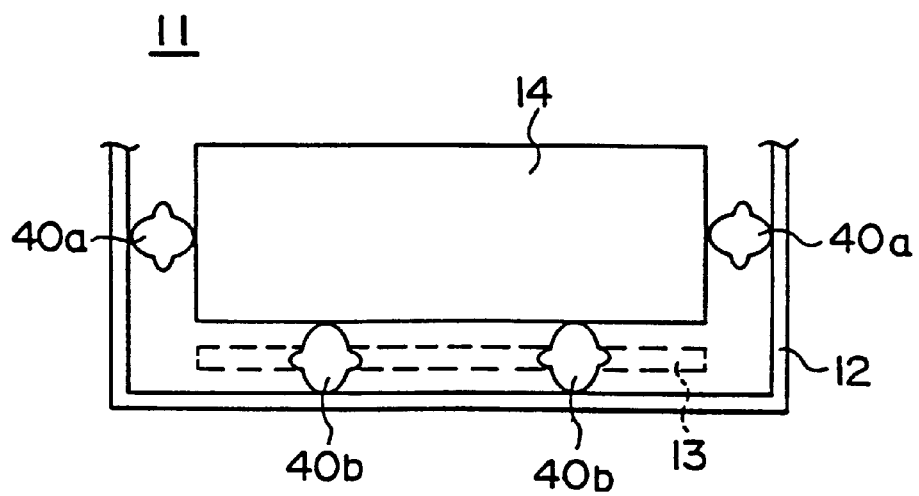

Accordingly, the improved vibration absorbing parts of the present embodiment can efficiently prevent the vibrations of the drive unit of the disk device even when the disk device is installed either in the horizontal attitude or in the vertical attitude. Since the improved vibration absorbing parts of the present embodiment can efficiently prevent the vibrations of the drive unit without using the dampers 40a and 40b as in the conventional disk device in FIGS. 2C and 2D.

Figure 21:
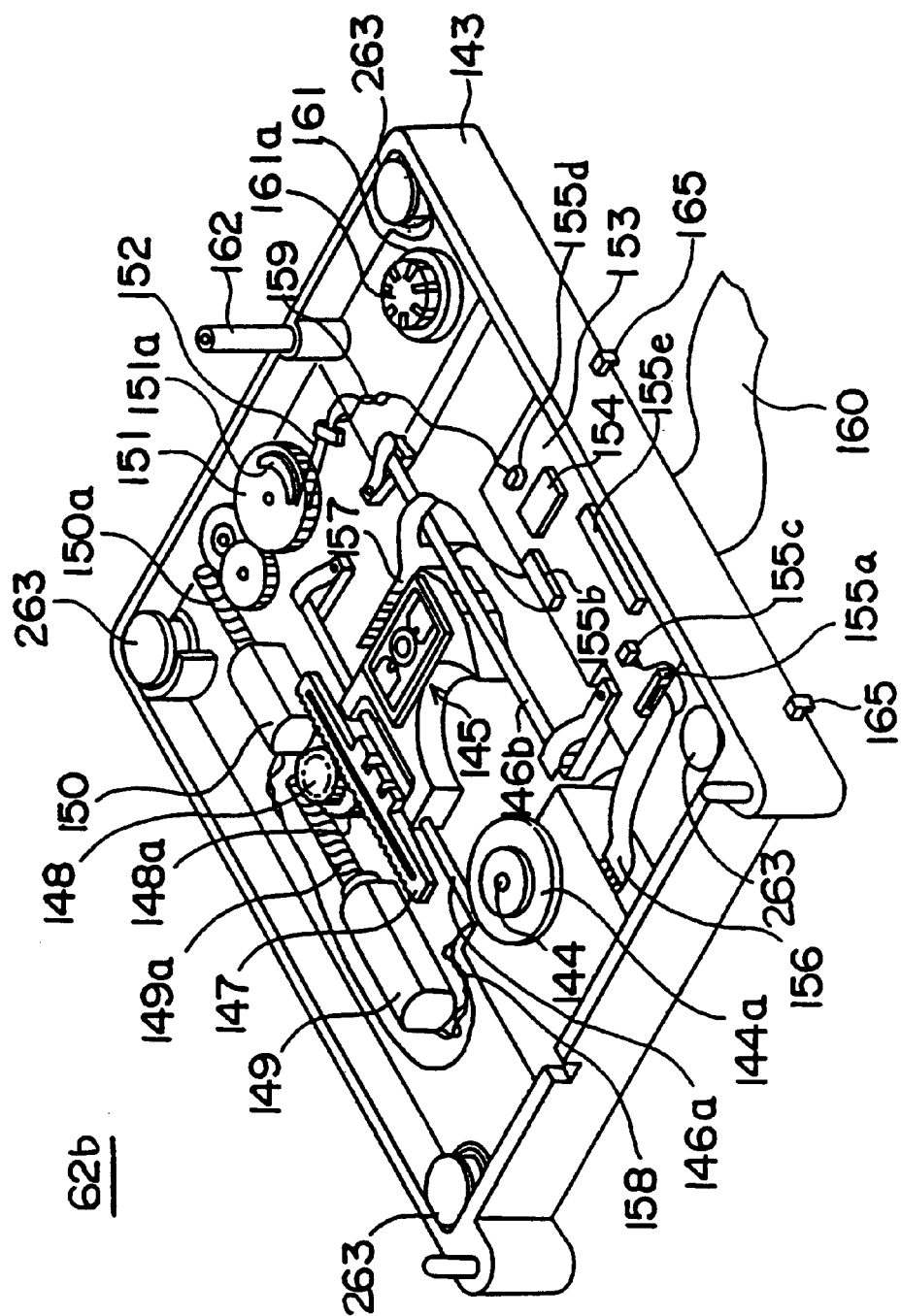
FIG. 21 is a perspective view of a drive unit of a disk device in which improved vibration absorbing parts in a further embodiment are included.

FIG. 21 shows a drive unit of a disk device in which improved vibration absorbing parts 263 in a further embodiment are included. In FIG. 21, the elements which are the same as corresponding elements in FIG. 11 are designated by the same reference numerals, and a description thereof will be omitted.

Similarly to the casing 52 of the disk device in FIG. 3, the casing 171 of the disk device of the present embodiment has the four bosses 181 at four corner portions of the casing 171. The drive unit (including the drive mechanism 62B) of the present embodiment shown in FIG. 21 is arranged within the casing 171 such that the insulators 263 of the chassis 143 are fitted into the bosses 181 of the casing 171. The insulators 263 of the chassis 143 are supported by the bosses 181 only, and the insulators 262 are not in contact with the base of the casing 171. The chassis 143 of the drive mechanism 62b is attached to the casing 171 via the insulators 263, and the insulators 263 serve to absorb vertical and horizontal vibrations of the drive unit (the drive mechanism 62B) when any impact is given to the disk device.

FIGS. 22A and 22B show one embodiment of the improved vibration absorbing parts 263 of the disk device in FIG. 21. As shown in FIG. 22A, the insulator 263 has a resin member 266 and a resilient member 267. The resin member 266 is made of a resin material such as ABS resin. The resilient member 267 is made of a resilient material such as rubber. The resin member 266 includes a circular base 266a, an annular rib 266b on the bottom of the base 266a, and a pair of restricting plates 266c attached to the bottom of the base 266a. The restricting plates 266c vertically extend from the bottom of the base 266a and are located within the annular rib 266b as shown in FIG. 22A.

As shown in FIG. 22B, the resilient member 267 is an annular hollow member having a connecting recess 267a. The resilient member 267 has an outer annular wall and an inner annular wall, and the resilient member 367 has an internal annular space 267b formed by the outer and inner annular walls. The inner periphery of the outer annular wall of the resilient member 267 is fixed to the outer periphery of the annular rib 266b of the resin member 266 by using an adhesive agent. The internal annular space 267b of the resilient member 267 is sealed by the resin member 266. The connecting recess 267a of the resilient member 267 is formed by the inside of the inner annular wall of the resilient member 267. The resilient member 267 is fitted to the resin member 266 such that the restricting plates 266c are enclosed in the annular space 267b. The connecting recess 267a of the resilient member 267 is inserted between the restricting plates 266c of the resin member 266. In the insulator 263 of the embodiment in FIG. 22B, the internal annular space 267b of the resilient member 267, sealed by the resin member 266, is filled with air 268. Alternatively, another gas different from the air 268 may be used instead such that the internal annular space 267b of the insulator 263 in FIG. 22B is filled with the other gas.

FIG. 22C shows another embodiment of the improved vibration absorbing parts 263 of the disk device in FIG. 21. In the insulator 263 of the present embodiment in FIG. 22C, the internal annular space 267b of the resilient member 267, sealed by the resin member 266, is filled with oil 269. Alternatively, another liquid different from the oil 269 may be used instead such that the internal annular space 267b of the insulator 263 in FIG. 22C is filled with the other liquid.

The drive unit (the drive mechanism 62B) including the insulators 263, shown in FIGS. 22A through 22C, is arranged in the casing 171 of the disk device, such that the connecting recesses 267a of the insulators 263 are fitted into the bosses 181 of the casing 171 and the outer annular walls of the resilient members 267 of the insulators 263 are fitted to the peripheries of the mounting holes of the chassis 143, respectively. Since the insulators 263 of the present embodiment include the above resilient members 267, the insulators 263 serve to absorb vertical and horizontal vibrations of the drive unit (the drive mechanism 62B) when any impact is given to the disk device. The resilient members 267 of the insulators 263 have the resilient characteristics thereof and include the air 268 or the oil 269 contained in the internal annular spaces 267b thereof. Thus, it is possible that the insulators 263 of the present embodiment efficiently prevent the vertical and horizontal vibrations of the drive unit (the drive mechanism 62B) in the disk device.

The restricting plates 266c of the insulators 263 serve to prevent the movement of the drive unit (the drive mechanism 62B) relative to the casing 171 due to the gravity of the drive unit when the disk device is installed in a vertical attitude. If the drive unit is moved relative to the casing 171 due to the gravity of the drive unit in the vertical-attitude disk device, the front opening of the disk holder of the drive unit deviates from the insertion opening 59 of the front bezel of the casing 171. In such a case, the disk cartridge 56 may not be easily inserted into or ejected from the disk device through the insertion opening 59. The insulators 263 of the present embodiment including the restricting plates 266c can prevent the occurrence of such a difficulty related to the insertion or ejection of the disk cartridge 56 in the vertical-attitude disk device.

Figure 23A:
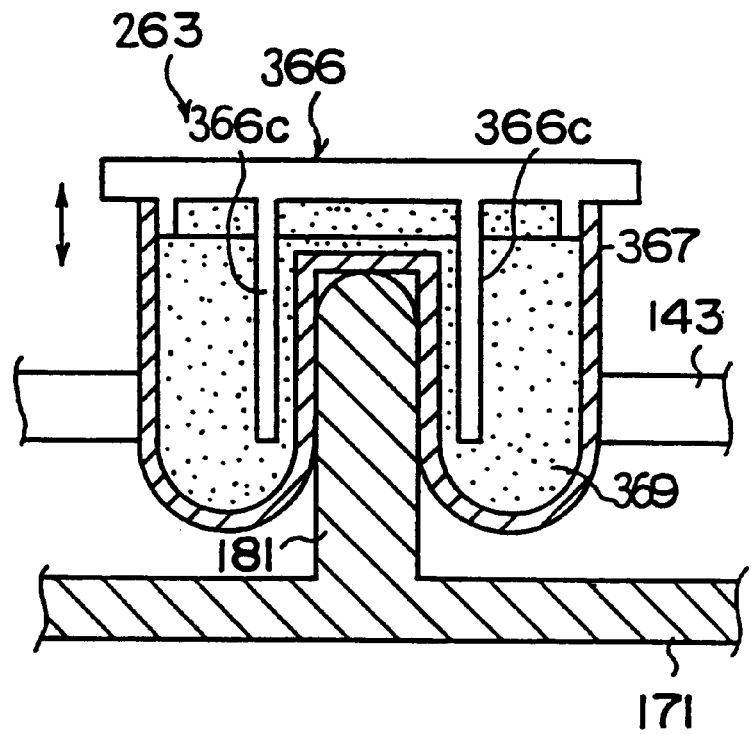
FIGS. 23A and 23B are diagrams showing an arrangement of the vibration absorbing parts on the drive unit in the disk device in FIG. 21.
Figure 23B:
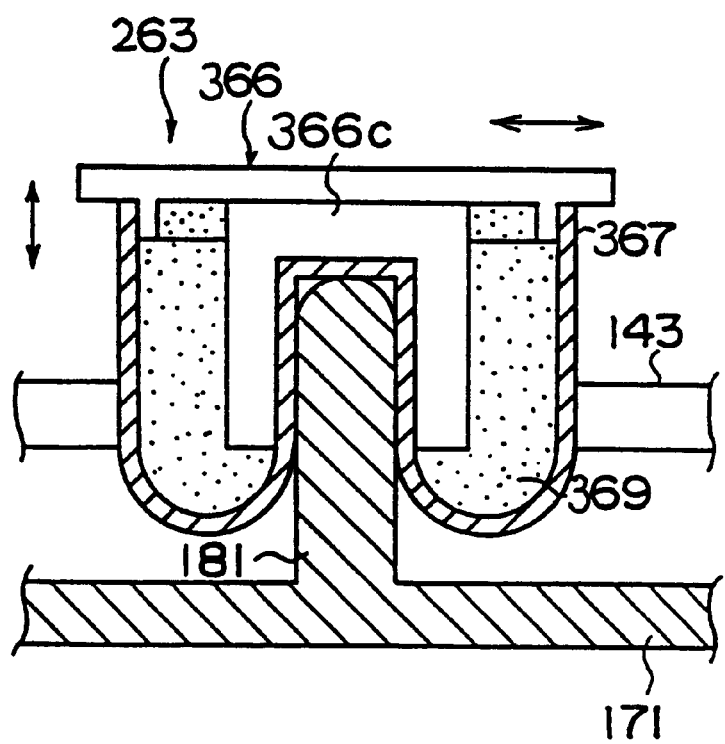

FIGS. 23A and 23B show an arrangement of the improved vibration absorbing parts 263 on the disk device in FIG. 21.

As shown FIGS. 23A and 23B, the drive unit (the drive mechanism 62B) including the insulators 263 (as shown in FIG. 22C) is arranged within the casing 171 of the disk device, such that the connecting recesses 267a of the insulators 263 are respectively fitted into the bosses 181 of the casing 171, and the outer annular walls of the resilient members 267 of the insulators 263 are respectively fitted to the peripheries of the mounting holes of the chassis 143. The bottom portions of the outer annular walls of the resilient members 267 of the insulators 263 downwardly project from the bottom of the chassis 143 but are not in contact with the base of the casing 171. The connecting recesses 267a of the insulators 263 are supported by the bosses 181 of the casing 171 only. Since the insulators 263 of the present embodiment include the above resilient members 267 (having the outer annular walls fitted to the chassis 143 and containing the oil 269 therein), the insulators 263 serve to absorb the vertical and horizontal vibrations of the drive unit (the drive mechanism 62B) when any impact is given to the disk device.

As described above, the resilient members 267 of the insulators 263 of the present embodiment have the resilient characteristics thereof and include the air 268 or the oil 269 contained in the internal annular spaces 267b of the resilient members 267. Thus, it is possible that the insulators 263 of the present embodiment efficiently prevent the vertical and horizontal vibrations of the drive unit (the drive mechanism 62b) in the disk device.

When the disk device is installed in a vertical attitude, the restricting plates 266c of the insulators 263 serve to prevent the movement of the drive unit (the drive mechanism 62B) relative to the casing 171 due to the gravity of the drive unit. Thus, even in such a case, the insulators 263 of the present embodiment efficiently prevent the vertical and horizontal vibrations of the drive unit (the drive mechanism 62B) in the disk device.

The disk device of the present invention can be applied to not only the CD-R disk drive (as in the above-described embodiments) but also a compact disk drive, a magnetic disk drive, a magneto-optical disk drive, and any other optical disk drive.

Further, the disk device of the present invention is not limited to the above-described embodiments, and variations and modifications may be made without departing from the scope of the present invention.

What is claimed is:

1. A disk device for reproducing information from a removable recording disk and/or for recording information in the disk, comprising:

a drive mechanism including at least a disk motor and an optical head, said disk motor rotating the disk, and said optical head accessing the disk to reproduce information from the disk and/or record information in the disk;

a first printed circuit board controlling said disk motor and said optical head of said drive mechanism, said first printed circuit board receiving signals from the optical head and sending signals to the optical head to perform the reproducing of information and/or the recording of information;

an audio printed circuit board electrically connected to said first printed circuit board, said audio printed circuit board having at least an audio function and being removable from the disk device for replacement;

a front bezel on which an eject button is arranged, said front bezel having a rear portion on a back of the front bezel, and said audio printed circuit board being arranged at said rear portion of said front bezel; and a casing on which said front bezel is mounted, said casing having a stepped portion on which said audio printed circuit is mounted, wherein said stepped portion of said casing has an opening adapted to have a flexible cable pass therethrough for electrically connecting said first printed circuit board with said audio printed circuit board.

2. The disk device according to claim 1, wherein the audio printed circuit board can be replaced with another printed circuit board having no audio function when the audio function of the audio printed circuit board is not required.

3. The disk device according to claim 1, wherein said casing accommodates at least the drive mechanism therein.

* * * * *